US012698829B2

(12) United States Patent
Oliver et al.

(10) Patent No.:  US 12,698,829 B2
(45) Date of Patent:      Aug. 4, 2026

(54) ANTI-FRICTION SEALING RINGS

(71) Applicant: Mainspring Energy, Inc., Menlo Park, CA (US)

(72) Inventors: Nathaniel Oliver, Menlo Park, CA (US); Matthew Svrcek, Redwood City, CA (US); Rucha Bedarkar, Mountain View, CA (US)

(73) Assignee: Mainspring Energy, Inc., Menlo Park, CA (US)

( * ) Notice: Subject to any disclaimer, the term of this patent is extended or adjusted under 35 U.S.C. 154(b) by 0 days.

(21) Appl. No.: 18/293,267

(22) PCT Filed: Jul. 28, 2022

(86) PCT No.: PCT/US2022/038709
§ 371 (c)(1),
(2) Date: Jan. 29, 2024

(87) PCT Pub. No.: WO2023/009746
PCT Pub. Date: Feb. 2, 2023

(65) Prior Publication Data
US 2025/0092951 A1      Mar. 20, 2025

Related U.S. Application Data

(60) Provisional application No. 63/227,775, filed on Jul. 30, 2021.

(51) Int. Cl.
*F16J 9/22*              (2006.01)
(52) U.S. Cl.
CPC ..................................... *F16J 9/22* (2013.01)

(58) Field of Classification Search
CPC . F16J 9/08; F16J 9/12; F16J 9/14; F16J 9/18; F16J 9/20; F16J 9/22; F16J 15/442; F16J 15/56
(Continued)

(56) References Cited

U.S. PATENT DOCUMENTS

| 1,052,705 | A | * | 2/1913 | Wismer | ..................... F16J 9/20 |
| | | | | | 277/529 |
| 1,369,989 | A | * | 3/1921 | Sullivan | ................... F16J 9/206 |
| | | | | | 277/497 |

(Continued)

FOREIGN PATENT DOCUMENTS

| CN | 1317655 A | 10/2001 |
| CN | 111520471 A | 8/2020 |

(Continued)

OTHER PUBLICATIONS

International Search Report and Written Opinion for International Application No. PCT/US2022/038709 dated Dec. 15, 2022.

*Primary Examiner* — Nicholas L Foster
(74) *Attorney, Agent, or Firm* — HG LAW LLP

(57)      ABSTRACT

Systems and methods are provided for a sealing element arranged in a ring groove of a piston assembly to seal against the ring groove at a first interface and to seal against a bore of a cylinder, in which the piston assembly is arranged, at a second interface. A feature of the sealing element is arranged at the first interface for reducing friction between the sealing element and the ring groove. The second interface is without a liquid lubricant or oil during operation.

12 Claims, 16 Drawing Sheets

(58) Field of Classification Search
USPC ................................................ 277/465, 493
See application file for complete search history.

(56) References Cited

U.S. PATENT DOCUMENTS

| | | | | | |
|---|---|---|---|---|---|
| 1,821,251 | A | * | 9/1931 | Williams | ................ F16J 9/206 |
| | | | | | 277/467 |
| 1,988,726 | A | * | 1/1935 | Godron | ..................... F16J 9/08 |
| | | | | | 277/463 |
| 1,988,727 | A | * | 1/1935 | Godrun | ..................... F16J 9/08 |
| | | | | | 277/463 |
| 1,999,494 | A | * | 4/1935 | Zahodiakin | ............. F16J 9/203 |
| | | | | | 277/463 |
| 2,112,103 | A | * | 3/1938 | Kottusch | ................. F16J 9/203 |
| | | | | | 277/924 |
| 2,209,925 | A | * | 7/1940 | Mason | ....................... F16J 9/20 |
| | | | | | 277/465 |
| 2,311,731 | A | * | 2/1943 | Bowers | ..................... F16J 9/20 |
| | | | | | 277/465 |
| 4,488,522 | A | * | 12/1984 | Jones | ........................ F16J 9/22 |
| | | | | | 92/213 |
| 4,964,274 | A | | 10/1990 | Bacardit | |
| 6,129,358 | A | * | 10/2000 | Kiesel | .................... F16J 15/164 |
| | | | | | 277/584 |
| 6,189,893 | B1 | * | 2/2001 | Hartmann | ................. F16J 9/22 |
| | | | | | 277/459 |
| 7,523,944 | B2 | * | 4/2009 | Hatori | ................... F16J 15/441 |
| | | | | | 277/460 |
| 9,470,179 | B2 | * | 10/2016 | Donahue | ................... F02F 3/24 |
| 9,845,765 | B2 | * | 12/2017 | Donahue | ................... F16J 9/08 |
| 9,856,981 | B2 | | 1/2018 | Meacham | |
| 10,094,472 | B2 | * | 10/2018 | Schroder | ............ F15B 15/1452 |
| 10,436,322 | B2 | | 10/2019 | Svrcek et al. | |
| 10,443,727 | B2 | * | 10/2019 | Svrcek | .................. F04B 1/0448 |
| 10,584,793 | B2 | * | 3/2020 | Schmidt | ..................... F16J 9/22 |
| 10,837,553 | B2 | * | 11/2020 | Hirtz | .................. F15B 15/1452 |
| 11,346,445 | B2 | * | 5/2022 | Svrcek | ........................ F16J 9/16 |
| 11,530,691 | B2 | * | 12/2022 | Svrcek | ................. F16J 15/3488 |
| 11,982,357 | B2 | * | 5/2024 | Shaer | ........................ F16J 9/203 |
| 12,078,250 | B2 | * | 9/2024 | Svrcek | ........................ F16J 9/16 |
| 12,188,457 | B2 | * | 1/2025 | Svrcek | .................. F04B 1/0448 |
| 2004/0079078 | A1 | | 4/2004 | Bacardit et al. | |
| 2006/0220322 | A1 | * | 10/2006 | McCormick | ............... F16J 9/22 |
| | | | | | 277/442 |
| 2015/0354497 | A1 | * | 12/2015 | Donahue | ................... F16J 9/08 |
| | | | | | 277/457 |
| 2016/0201597 | A1 | * | 7/2016 | Donahue | ................... F16J 9/08 |
| | | | | | 123/193.6 |
| 2016/0369894 | A1 | * | 12/2016 | Schroder | ................... F16J 1/09 |
| 2018/0283552 | A1 | * | 10/2018 | Schmidt | ................... F16J 9/20 |
| 2019/0049006 | A1 | | 2/2019 | Prudhomme et al. | |
| 2019/0049009 | A1 | * | 2/2019 | Svrcek | ........................ F16J 9/16 |
| 2019/0049013 | A1 | * | 2/2019 | Svrcek | ................. F16J 15/3488 |
| 2019/0390770 | A1 | * | 12/2019 | Svrcek | ................. F16J 9/16 |
| 2020/0011417 | A1 | * | 1/2020 | Svrcek | ................. F04B 1/0448 |
| 2020/0158242 | A1 | * | 5/2020 | Berner | ................. F16J 15/324 |
| 2020/0173554 | A1 | * | 6/2020 | Hirtz | .................. F15B 15/1452 |
| 2021/0381597 | A1 | * | 12/2021 | Shaer | ........................ F16J 9/20 |
| 2022/0356948 | A1 | * | 11/2022 | Svrcek | ........................ F16J 9/16 |
| 2023/0072947 | A1 | * | 3/2023 | Svrcek | ........................ F16J 9/28 |
| 2025/0060035 | A1 | * | 2/2025 | Svrcek | ........................ F16J 9/16 |
| 2025/0102062 | A1 | * | 3/2025 | Rabello | ..................... F16J 9/26 |

FOREIGN PATENT DOCUMENTS

| | | | |
|---|---|---|---|
| CN | 112610451 | A | 4/2021 |
| GB | 1222609 | A | 10/1990 |

* cited by examiner

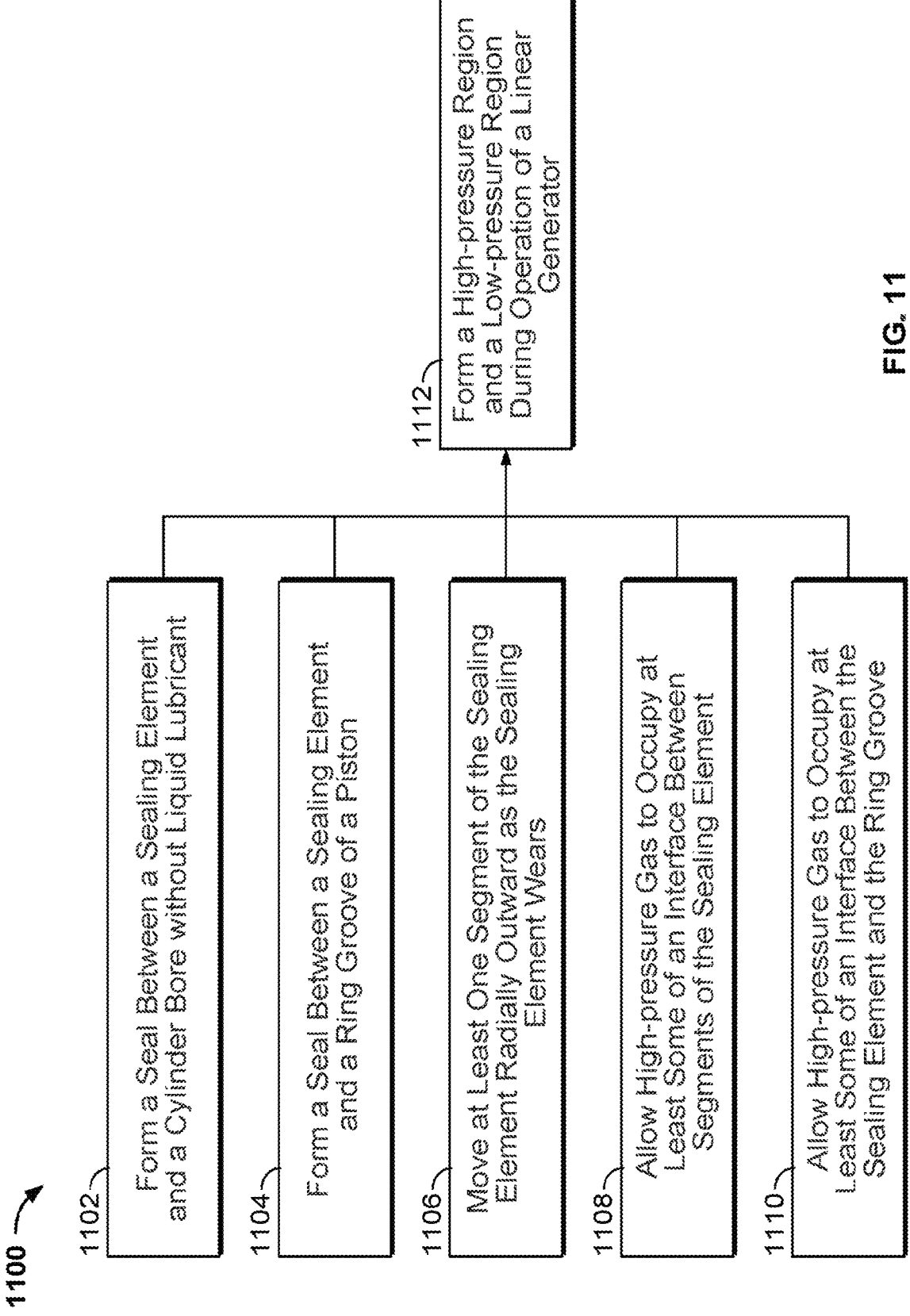

1100

1102 — Form a Seal Between a Sealing Element and a Cylinder Bore without Liquid Lubricant 1104 — Form a Seal Between a Sealing Element and a Ring Groove of a Piston 1106 — Move at Least One Segment of the Sealing Element Radially Outward as the Sealing Element Wears 1108 — Allow High-pressure Gas to Occupy at Least Some of an Interface Between Segments of the Sealing Element 1110 — Allow High-pressure Gas to Occupy at Least Some of an Interface Between the Sealing Element and the Ring Groove 1112 — Form a High-pressure Region and a Low-pressure Region During Operation of a Linear Generator

FIG. 11

ANTI-FRICTION SEALING RINGS

CROSS-REFERENCE TO RELATED APPLICATIONS

This application is a national stage application under 35 U.S.C. § 371 of International Application PCT/US2022/038709, filed Jul. 28, 2022, which claims the benefit of U.S. Provisional Patent Application No. 63/227,775 filed Jul. 30, 2021, the disclosures of which are hereby incorporated by reference herein in their entireties.

The present disclosure is directed to features for reducing friction between a sealing ring and a piston, and more particularly, to patterned recesses in the sealing ring and/or piston land to reduce interfacial friction to allow the sealing ring to move (e.g., radially) to maintain a seal.

SUMMARY

In a linear generator (e.g., or any other suitable piston-cylinder device which uses a gas as its working fluid), piston rings may need to maintain firm contact (e.g., minimal clearance) with or otherwise form a seal with a piston, cylinder wall, other ring segments, or a combination thereof. A pressure difference between the gas in the cylinder (e.g., a high-pressure region in front of the seal) and an ambient or near ambient condition (e.g., a low-pressure region behind the seal) may provide sufficient force to maintain adequate contact pressure at sealing interfaces. It will be understood that "in front" refers to a position or relative position axially nearer the high-pressure region, "behind" refers to a position or relative position axially further from the high-pressure region. Ring segments may also need to move relative to the piston, cylinder, and other ring segments freely in order to accommodate axial and eccentric piston motion in addition to variation along the profile of the cylinder bore. The inability to freely slide (e.g., due to friction forces that may arise from contact forces at interfaces) at any sealing interface can cause high contact forces between components and open gaps at other sealing interfaces. These high contact forces may result in the seal at any of the sealing interfaces to fail. A pressure differential (e.g., a difference between a high-pressure region, populated by pressurized fluid from a reaction section, and a low-pressure region) across sealing interfaces for many piston-cylinder devices is beneficial in maintaining the seal. The friction forces resulting from the pressure differential oppose the relative motion of the two interfacing surfaces. These friction forces cause the surface of the piston ring to wear, fail to accommodate variations in the bore, or otherwise deviate from expected sealing interface performance.

In some circumstances (e.g., extreme cases), this friction force can be large enough to lock the ring segment in place. For example, if the friction force at the interface (e.g., contact interface) between the ring and piston is large relative to the force applied by the gas pressure driving the ring radially outwards, an expansion in the cylinder wall diameter (e.g., due to thermal expansion, which may be non-uniform along the bore) may result in the ring-cylinder contact opening (e.g., forming a gap and a lesser seal). Gas can then leak past the outer surface (e.g., at the outer diameter (OD)) of the ring. The pressure of the gas flowing past the OD further reduces the net force driving the ring radially outwards, and may cause the ring to remain in place and the seal to fail.

In some circumstances (e.g., less extreme scenarios), the driving forces are sufficient to overcome friction and generate motion/displacement of the ring segment. However, the friction at the ring surface also applies a shear load to the ring segment itself. If there is a discontinuity in the magnitude or direction of friction (e.g. at an edge of a sliding interface) the friction load can fracture the ring. Consequently, it is advantageous to minimize the friction acting on ring segments at sealing interfaces.

The present disclosure is directed to a piston assembly. The piston assembly comprises a piston comprising a ring groove, and a sealing element arranged in the ring groove to seal against the ring groove at a first interface and to seal against a bore of a cylinder at a second interface, wherein a feature is arranged at the first interface for reducing friction between the sealing element and the ring groove. Additionally, the first and second interfaces are without a liquid lubricant or oil during operation.

In some embodiments, one of the ring groove or the sealing element comprises the feature.

In some embodiments, the feature comprises a set of channels arranged to receive gas from a high-pressure region to lessen a contact force between the sealing element and the piston.

In some embodiments, the feature reduces a contact force between the sealing element and the piston to reduce a friction force between the sealing element and the piston in both the radial and azimuthal direction.

In some embodiments, the disclosure is directed to a sealing ring assembly comprising at least one ring segment. The sealing ring assembly is configured to seal against a bore of a cylinder, wear against the bore, and seal against a ring groove of a piston, wherein a feature arranged at an interface between the sealing ring assembly and the ring groove is configured to reduce a friction force.

In some embodiments, the sealing ring assembly, that seals against a bore of a cylinder and wears against the bore of the cylinder, comprises a first segment, a second segment, and a feature arranged at an interface between the first segment and the second segment that reduces a friction force.

In some embodiments, the disclosure is directed to a sealing ring assembly comprising a first sealing element comprising at least one first segment, and a second sealing element comprising at least one second segment, wherein the second sealing element is arranged axially rearward of the first sealing element. Additionally, a feature is arranged at an interface between the at least one first segment and the at least one second segment for reducing a friction force at an interface between the first sealing element and the second sealing element.

In some embodiments, feature comprises a set of channels arranged to receive gas from a high-pressure region to lessen a contact force at the interface.

In some embodiments, feature reduces a contact force at the interface to reduce a friction force on the sealing element in the radial and azimuthal direction.

In some embodiments, the disclosure is directed to a linear generator comprising a cylinder comprising a bore, and a translator comprising a piston arranged relative to the cylinder to move along the bore without a liquid lubricant or oil, wherein the piston comprises a ring groove. The linear generator further comprises a stator configured to electromagnetically interact with the translator, a sealing element arranged in the ring groove to seal against the ring groove at a first interface and to seal against the bore of the cylinder at a second interface, and a feature arranged at the first interface that reduces friction between the sealing element and the ring groove.

The disclosure is directed to a linear generator comprising a cylinder comprising a bore, and a translator comprising a piston arranged relative to the cylinder to move along the bore without a liquid lubricant or oil, wherein the piston comprises a ring groove. The linear generator further comprises a stator configured to electromagnetically interact with the translator, a sealing element arranged in the ring groove and comprising a first segment and a second segment, wherein the sealing assembly seals against the ring groove at a first interface. The first segment and the second segment seal against each other at a second interface. Additionally, a feature is arranged at the second interface that reduces friction between the first segment and the second segment.

In some embodiments, the sealing element defines a lower-pressure region and a higher-pressure region, the piston undergoes successive strokes, gas flows from the high-pressure region to the feature during at least some of each stroke, and the gas flows from the first interface to the lower-pressure region during at least some of each stroke.

In some embodiments, the feature comprises a set of channels arranged to receive gas from a high-pressure region of the cylinder to lessen a contact force on the sealing element.

In some embodiments, the feature reduces a contact force on the sealing element to reduce a friction force on the sealing element in the radial and azimuthal direction.

In some embodiments, the disclosure is directed to a method for sealing between a piston and a cylinder. The method comprises forming a seal between a sealing element and a bore of the cylinder without a liquid lubricant or oil, forming a seal between the sealing element and a ring groove of the piston, and allow a gas from a high-pressure region to occupy at least some of an interface between a first segment and a second segment of the sealing element to reduce a friction force.

In some embodiments, the disclosure is directed to a method for sealing between a piston and a cylinder, the method comprising forming a seal between a sealing element and a bore of the cylinder without a liquid lubricant or oil, forming a seal between the sealing element and a ring groove of the piston, and allow a gas from a high-pressure region to occupy at least some of an interface between the sealing element and the piston to reduce a friction force.

In some embodiments, the method further comprises moving the sealing element radially outward to maintain the seal with the bore during a cycle and as the sealing element wears.

In some embodiments, the method further comprises venting the gas to a lower-pressure region during at least some of a stroke of the piston.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

FIG. 11 is a flow chart of an illustrative technique for sealing a piston-cylinder device, in accordance with some embodiments of the present disclosure.

DETAILED DESCRIPTION

The present disclosure is applicable towards features for reducing piston-ring friction.

The term "seal" as used herein, refers to the creation, maintenance, or both of a high-pressure region and a low-pressure region. For example, a seal may include a sealing ring assembly that is configured to reduce a leakage rate of gas from a high-pressure region to a low-pressure region, by limiting flow between a high-pressure boundary and a low-pressure boundary of the seal. Accordingly, a seal can be defined in terms of its constraints on a leakage rate. It will be understood that a seal, such as a sealing ring assembly, as described herein, may have any suitable corresponding leakage rate. For example, in some circumstances, a relatively worse seal may allow more leakage, but may be acceptable based on one or more relevant performance criterion. In a further example, a sealing ring assembly configured for high efficiency operation of a piston and cylinder device may have a relatively low leakage rate (e.g., be a more effective seal).

As used herein, a "ring segment" shall refer to a sealing element extending for an azimuthal angle greater than zero degrees, having a radially outer surface, and configured to seal at least along a portion of the radially outer surface against a bore. A ring segment may include end faces, if not azimuthally contiguous around the full bore.

As used herein, a "ring" shall refer to a sealing element including at least one ring segment, which may be, but need not be, azimuthally contiguous along a bore. For example, a ring may include one ring segment, in which case these terms overlap. In a further example, a ring may include four ring segments, in which case the ring refers to the collective of the four ring segments. A ring may include, but need not include, one or more interfaces between one or more ring segments. A "ring" shall also refer to a sealing element including at least one ring segment configured to seal against a land of a piston.

As used herein, a "gap cover element" shall refer to a sealing element configured to seal against one or more ring segments at an interface, and to seal against at least a portion of a bore during wear of the one or more ring segments. While a gap cover element may function as a ring segment as the ring wears, for purposes of the discussion in the present disclosure, a gap cover element is not considered to be a ring segment for purposes of clarity.

As used herein, a "sealing ring assembly" shall refer to an assembly of one or more rings, and sometimes also one or more gap covers elements, configured to engage with a piston and configured to seal between a high-pressure region and a low-pressure region of a cylinder. For example, a single ring segment may be a ring and a sealing ring assembly. In a further example, several ring segments and corresponding gap covers may be a sealing ring assembly.

Figure 1:
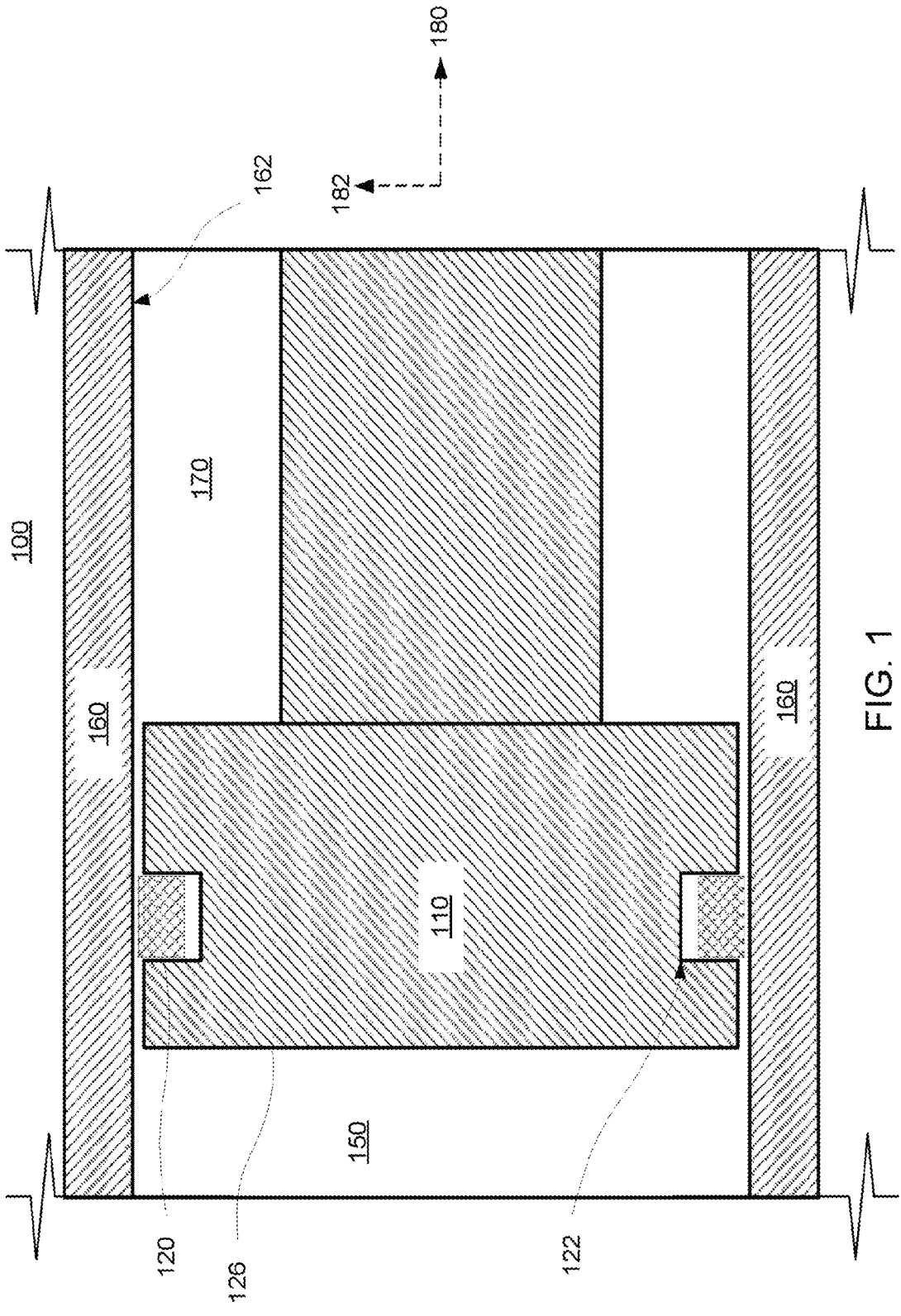
FIG. 1 shows a cross-sectional view of an illustrative piston and cylinder assembly, in accordance with some embodiments of the present disclosure.

FIG. 1 shows a cross-sectional view of illustrative piston and cylinder assembly 100, in accordance with some embodiments of the present disclosure. Cylinder 160 may include bore 162, which is the inner cylindrical surface in which piston assembly 110 travels. Piston assembly 110 may include piston 126, which includes a sealing ring groove 122, in which sealing ring assembly 120 is configured to ride. As piston assembly 110 translates along the axial direction shown by axis 180 (e.g., during an engine cycle), in cylinder 160, the gas pressure in high-pressure region 150 may change (high-pressure region 150 may be closed with a cylinder head or an opposing piston). For example, as piston assembly 110 moves opposite the direction of axis 180 (i.e., to the left in FIG. 1), the pressure in high-pressure region 150 may increase. Low-pressure region 170, located to the rear of sealing ring assembly 120 may be at a gas pressure below the pressure of high-pressure region 150 for at least some, if not most, of a piston stroke or cycle of piston and cylinder assembly 100. The pressure ranges in high-pressure region 150 and low-pressure region 170 may be any suitable ranges (e.g., sub-atmospheric pressure to well over 250 bar), and may depend on compression ratio, breathing details (e.g., boost pressure, pressure waves, port timing), losses, thermochemical properties of gases, and reaction thereof. Accordingly, the sealing ring assemblies described herein may be used to seal any suitable high-pressure region and low-pressure region, having any suitable pressure ranges. It will be understood that the "front" of sealing ring assembly 120 refers to the face axially nearest high-pressure region 150, and the "rear" of sealing ring assembly 120 refers to the face axially nearest low-pressure region 170.

It will be understood that unless otherwise specified, all pressures referred to herein are in absolute units (e.g., not gage or relative).

It will be understood that high-pressure and low-pressure may refer to transient pressure states of a piston and cylinder device. For example, referencing an engine cycle, the high-pressure side of a sealing ring assembly may have a pressure greater than a low-pressure side of the sealing ring assembly for most of the engine cycle (e.g., except possibly during breathing or near-breathing portions of the cycle). Accordingly, high-pressure and low-pressure are relative and depend on the conditions of the gas being sealed.

A sealing ring assembly may be used to seal a high-pressure and a low-pressure region, each operating in any suitable pressure range. It will also be understood that a sealing ring assembly may seal differently at different positions in a cycle. It will be further understood that a low-pressure region may include a pressure greater than a pressure of a high-pressure region for some of a piston stroke or cycle of a piston and cylinder assembly. For example, a sealing ring assembly may always seal a high-pressure region from a low-pressure region. In a further example, a sealing ring assembly may seal a high-pressure region from a low-pressure region as long as the pressure in the high-pressure region is greater than the pressure in the low-pressure region. In a further example, a sealing ring assembly may seal a high-pressure region from a low-pressure region as long as the pressure in the high-pressure region is greater than the pressure in the low-pressure region, and conversely, seal a low-pressure region from a high-pressure region as long as the pressure in the low-pressure region is greater than the pressure in the high-pressure region.

In some embodiments, sealing ring assembly 120 may deposit material on bore 162 of cylinder 160 (e.g., include a self-lubricating material). Deposited material may lubricate the bore-to-sealing ring assembly interface between bore 162 and sealing ring assembly 120 (e.g., provide a dry lubricant). Accordingly, in some embodiments, piston and cylinder assembly 100 may operate without a liquid for lubrication (e.g., oil).

In some embodiments, piston 126 may be an open-faced piston. For example, piston 126 may include openings, cutouts, or other fluid paths from high-pressure region 150 to ring groove 122. Accordingly, in some embodiments employing an open-faced piston, the inner radial surfaces (e.g., referencing axis 182 in the radial direction in FIG. 1) of sealing ring assembly 120 may be exposed to gas pressure of high-pressure region 150.

Lubrication and Material Selection

Figure 2:
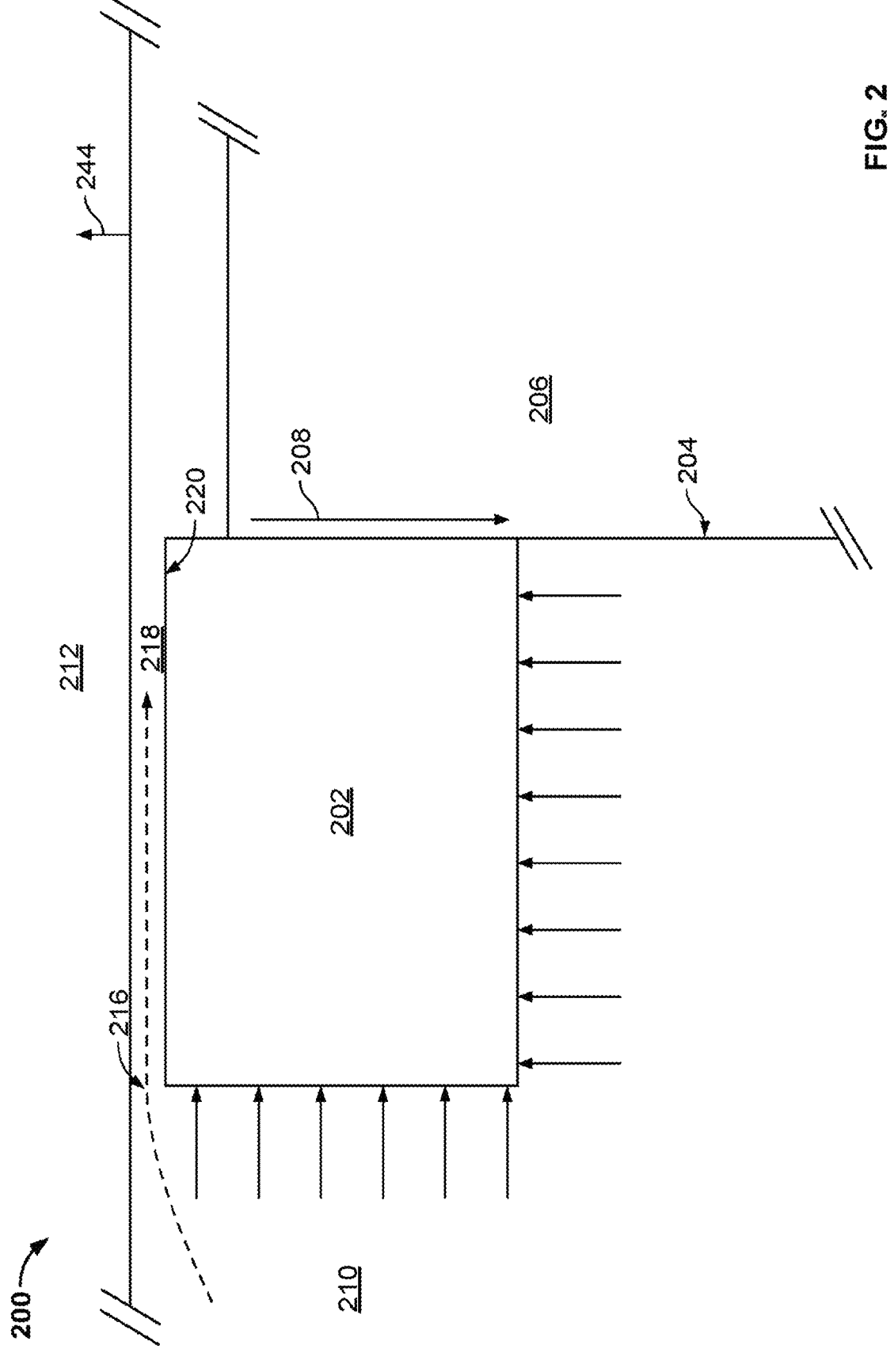
FIG. 2 shows an illustrative ring seal failure due to friction locking, in accordance with some embodiments of the disclosure.

FIG. 2 depicts scenario 200 wherein ring 202 is subjected to enough friction where ring 202 locks against surface 204 of piston 206, in accordance with some embodiments of the disclosure. Scenario 200 may comprise circumstances which drive lubrication rates as well as material selection for various components and features of the present disclosure. Scenario 200 may comprise more or fewer than the elements depicted in FIG. 2; for example, ring 202 may be biased radially outward toward the cylinder 212 by a spring. Any or all of the components, features, and elements depicted in or described in reference to FIG. 2 may be incorporated into any or all of FIGS. 1 and 3-19.

Ring 200 is depicted as being stuck or otherwise not free to move (e.g., slide) relative to surface 204 of piston 206. Friction force 208 is illustrated by the arrow running parallel to surface 204. Friction force 208 at the interface (e.g., contact interface) between ring 202 and surface 204 is large relative to the force applied by gas pressure 210, which drives ring 202 radially outwards towards cylinder wall 212. Cylinder wall 212 may expand along radial direction 244 such that a diameter corresponding to cylinder wall 212 exceeds an expanded diameter of ring 202. The expansion of cylinder wall 212 may be caused by thermal expansion, which may be non-uniform along the bore. The expansion of cylinder wall 212 creates ring-cylinder contact opening 218 (e.g., forming a gap and a lesser seal). Gas is then allowed to follow gas leak trajectory 216 past outer surface 220 of ring 202 (e.g., at the outer diameter, or OD, of ring 202). The pressure of the gas flowing past the OD further reduces the net force driving the ring radially outwards, and ensures that the ring remains in place and the seal fails entirely.

One method for reducing friction at a sealing interface (e.g., between ring 202 and surface 204) is to reduce the magnitude of friction for a given contact force, or otherwise the coefficient of friction. For example, this may be done by applying a liquid lubricant at the interface (e.g., along surface 204). Such techniques focus on reducing the force transmitted by the lubricant by modifying the lubricant's properties or on increasing the thickness of the film of lubricant separating the two surfaces.

In the absence of a lubricant, the materials of the interfacing surfaces may be selected to have an inherently low coefficient of friction. The surfaces themselves can also be coated, polished, or otherwise prepared to reduce the coefficient of friction.

Aspect Ratio

Figure 3:
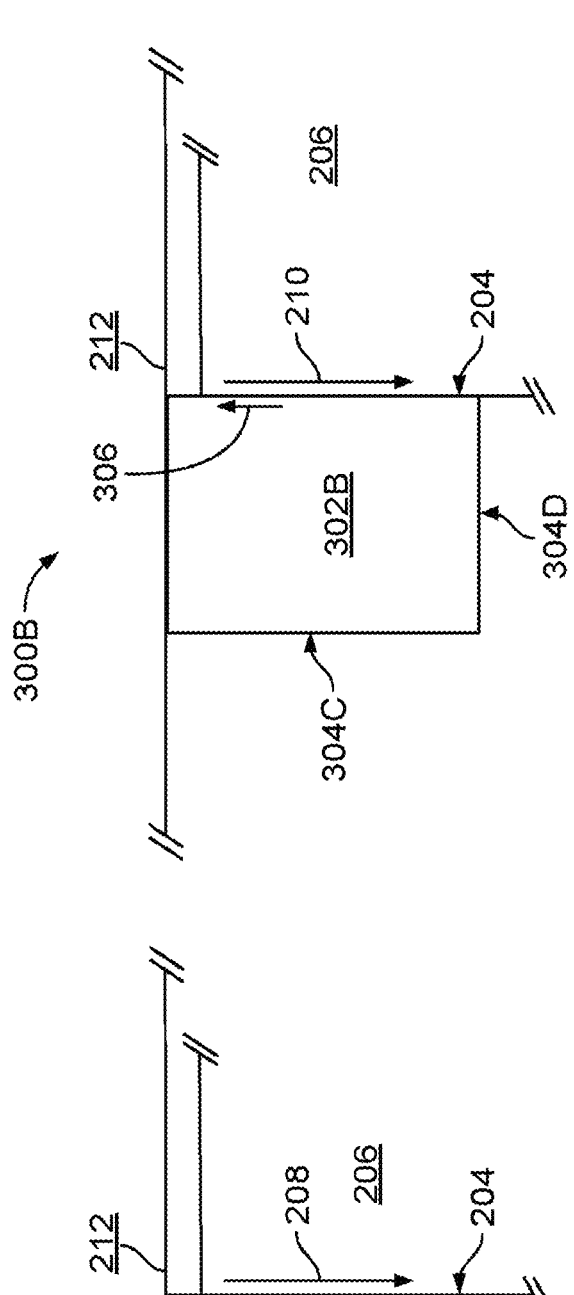
FIG. 3 shows examples of ring radial motion with low and high aspect ratios, in accordance with some embodiments of the present disclosure.

FIG. 3 depicts scenario 300A corresponding to a low aspect ratio, wherein ring 302A comprises low radial surface area 304B arranged parallel to surface 204 of piston 206, and scenario 300B corresponding to a high aspect ratio, wherein ring 302B comprises high radial surface area 304C arranged parallel to surface 204 of piston 206, in accordance with some embodiments of the disclosure. Each of scenarios 300A and 300B may comprise circumstances which drive lubrication rates as well as material selection for various components and features of the present disclosure. Each of scenarios 300A and 300B may comprise more or fewer than the elements depicted in FIG. 3. Any or all of the components, features, and elements depicted in or described in reference to FIG. 3 may be incorporated into any or all of FIGS. 1, 2, and 4-19.

As shown in scenario 300A, the cylinder pressure (e.g., in the high-pressure region behind high radial surface area 304A) needs to overcome friction force 208 to move ring 202 radially outwards along desired ring trajectory 306. Friction force 208 holds ring 302A in place, as shown, along surface 204 of piston 206. The magnitude of friction force

208 is reduced based on a reduction of a radial thickness or area of ring 302A (e.g., corresponding to low radial surface area 304B) relative to an axial thickness or area of ring 302A (e.g., correspond to high radial surface area 304A). Thus, the pressure-exposed area of ring 302A that contacts surface 204 is reduced, while the pressure-exposed area driving ring 302A radially outwards is maintained or increased (e.g., high-pressure surface area 304A is larger than low-pressure surface area 304B).

In contrast, the pressure-exposed area labeled as high-pressure surface area 304C of ring 302B is arranged parallel to surface 204 of piston 206. This arrangement reduces the area of a surface of ring 302B across low-pressure exposed area 304D, thereby increasing friction force 210 while decreasing the force pressing ring 302B towards cylinder wall 212. This principle can be applied more generally by increasing the pressure-exposed area normal to desired ring trajectory to reduce friction force. In some circumstances, it may become difficult to apply this concept to more complex geometries (e.g., where one surface is non-linear). Additionally, motion of rings 302A and 302B that is driven by means other than cylinder pressure that expands rings 302A and 302B radially outwards towards cylinder 212 may reduce the effectiveness this effect.

Gas Pockets

Figure 4:
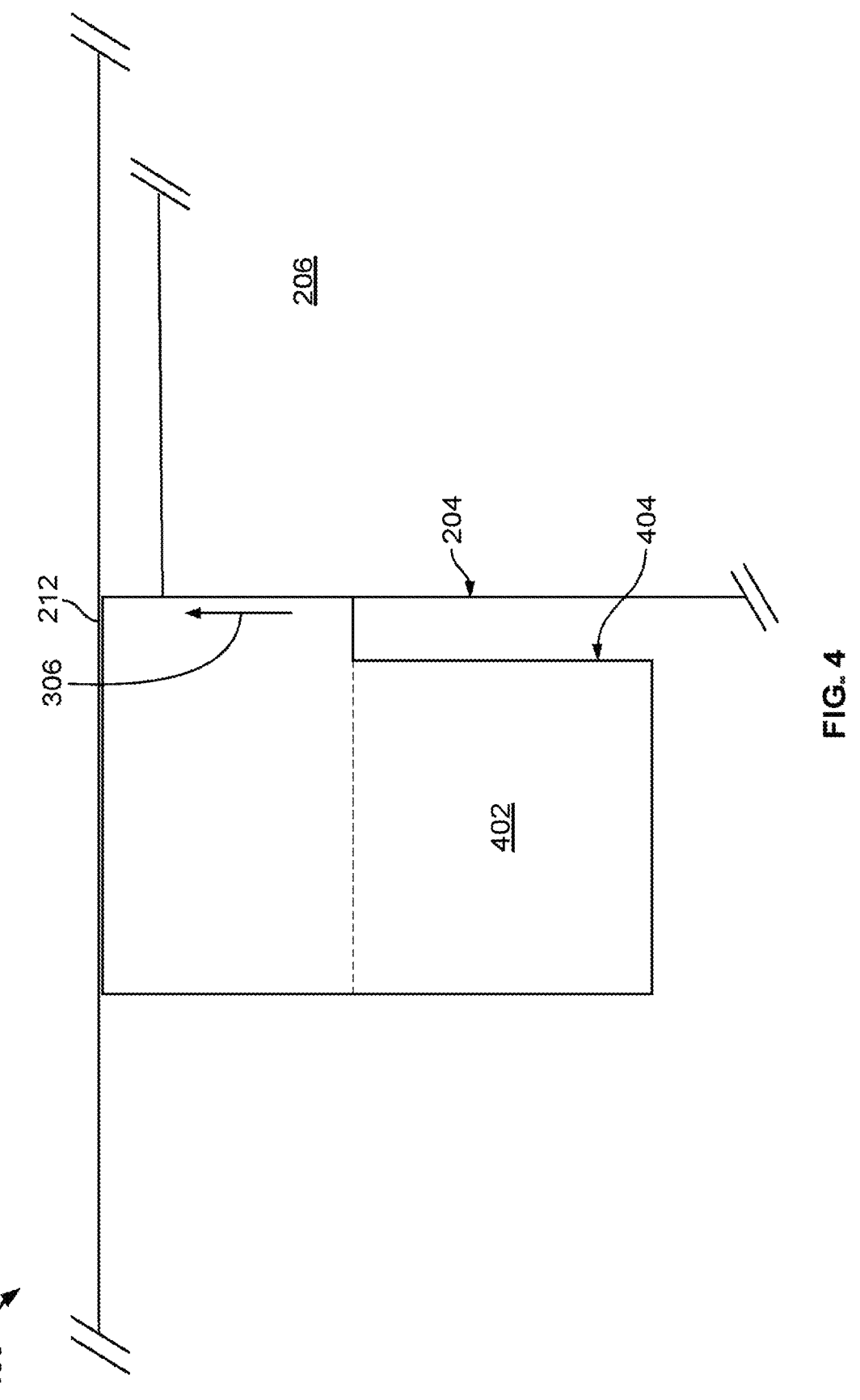
FIG. 4 shows an example of ring radial motion with the use of a gas pocket, in accordance with some embodiments of the present disclosure.

FIG. 4 depicts scenario 400 wherein ring 402 comprises gas pocket 404 (e.g., a friction-reduction feature) with surface 204 of piston 206, in accordance with some embodiments of the disclosure. Scenario 400 may comprise circumstances which drive lubrication rates as well as material selection for various components and features of the present disclosure. Scenario 400 may comprise more or fewer than the elements depicted in FIG. 4. Any or all of the components, features, and elements depicted in or described in reference to FIG. 4 may be incorporated into any or all of FIGS. 1-3, and 5-19.

In some circumstances, it is not desirable to change the ring aspect ratio. For example, a radially thicker ring could be required to achieve adequate stiffness. In some such cases, as shown in FIG. 4, the contact pressure can be reduced by removing a portion of the contact surface area between ring 402 and surface 204 of piston 206. This forms gas pocket 404, which is configured to be filled by cylinder gas (e.g., from a high-pressure region of ring 402 on a surface opposite of a contact surface between ring 402 and cylinder wall 212). A large ring aspect ratio (e.g., wherein the contact surface area between ring 402 and surface 204 exceeds the surface area of ring 402 exposed to the high-pressure region) can be overcome by offsetting the axial pressure force with gas pressure in gas pocket 404 acting in a direction opposite of the axial pressure force causing ring 402 to form a seal against cylinder wall 212. As shown via scenario 400, desired ring trajectory 306 is enabled with the use of gas pocket 404, in accordance with some embodiments of the present disclosure.

Further, replacing sealing surface area with gas-filled pockets (e.g., one or more of gas pocket 404) can have the same impact as changing ring aspect ratio by reducing the net pressure-exposed area normal to the contact (e.g., and parallel to the direction of desired piston trajectory 306). This concept may be applied so long as adequate seal length (e.g., a surface area of ring 402 contacting surface 204) is maintained between all pockets and ambient pressure gas. Additionally, for the desired effect to be achieved, an adequate net force normal to the contact is maintained relative to any forces in the opposite direction (e.g., at least one of acceleration or friction at other surfaces normal to surface 204).

Figure 5:
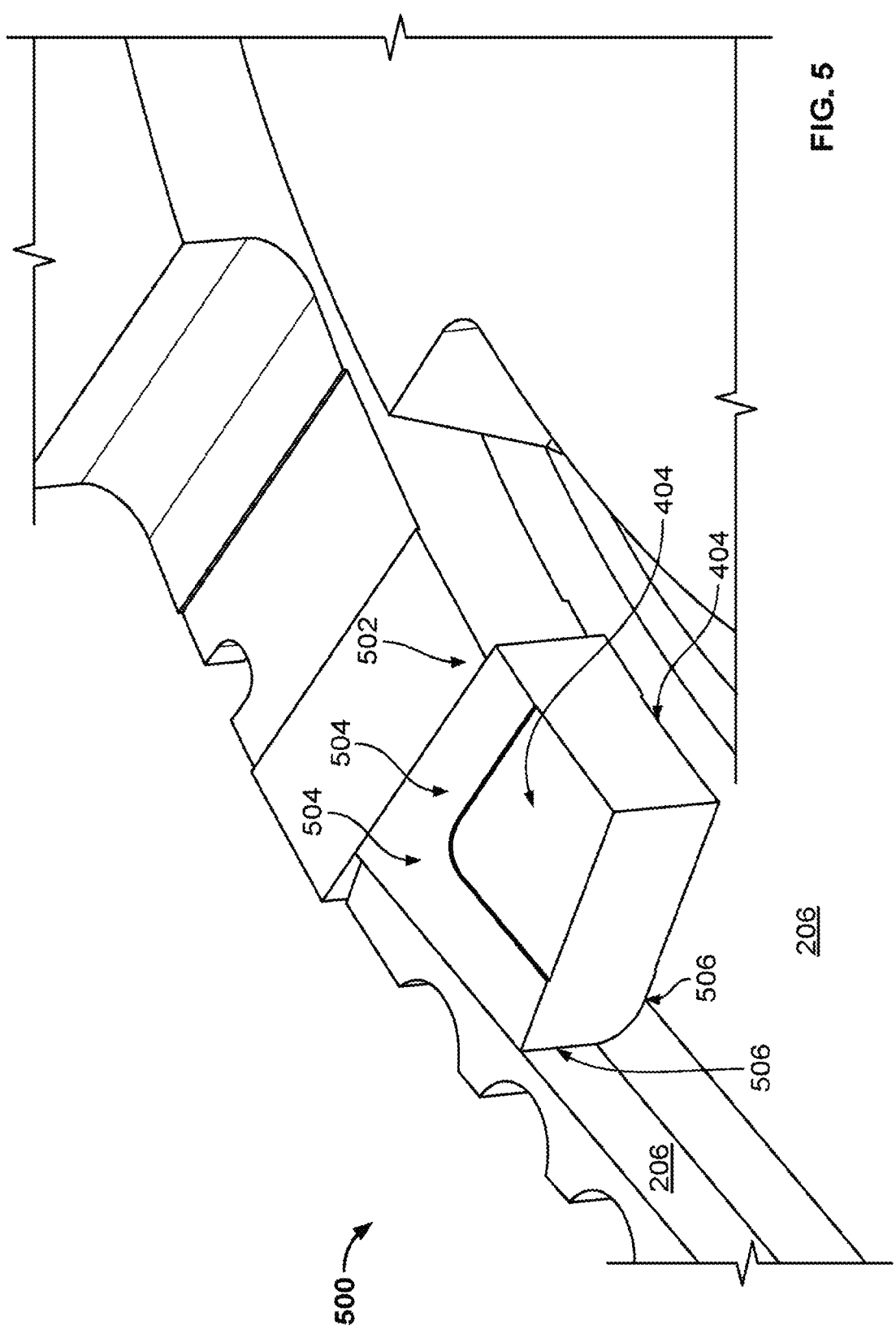
FIG. 5 shows an example of a gas pocket applied to reduce friction force in segmented ring-pack, in accordance with some embodiments of the present disclosure.

FIG. 5 depicts assembly 500 comprising first ring segment 502 forming a seal against second ring segment 504, in accordance with some embodiments of the disclosure. Assembly 500 may be subjected to circumstances which drive lubrication rates as well as material selection for various components and features of the present disclosure. Assembly 500 may comprise more or fewer than the elements depicted in FIG. 5. Any or all of the components, features, and elements depicted in or described in reference to FIG. 5 may be incorporated into any or all of FIGS. 1-4 and 6-19.

Assembly 500 is shown with second ring segment 504 comprised of gas pockets 404 of FIG. 4. Gas pockets 404 are configured to reduce a friction force between contact surfaces 506 and piston 206, in accordance with some embodiments of the present disclosure. Second ring segment 504 forms a seal against piston 206. In some embodiments, a third ring segment (not shown) may be arranged on top of second ring segment 504. First ring segment 502 is configured and arranged to slide outwards towards an outer surface of piston 206 and also is configured to slide towards segment 504 to maintain a seal between the segments. In some circumstances, segment 504 may lock in place along piston 206 which may result in a gas leak between segment 504 and segment 502. The addition of gas pockets 404 allows second segment 504 to move more freely by reducing the friction force between second ring segment 504 and piston 206 and between second ring segment 504 and a third ring segment (not shown) which may be arranged on top of second ring segment 504 to create a seal against a surface of segment 504 to prevent or eliminate the leak.

Considerations for Materials, Aspect Ratio, and Pockets

In some high-temperature applications (e.g., in oxidizing environments), most liquid lubricants are not chemically stable and most low-friction materials and coatings don't retain enough strength to be used in or as structural elements. Self-lubricating materials, such as graphite and certain polymers, may be used to construct the rings to eliminate scuffing and galling failures and reduce friction. However, in high-pressure applications, the friction force can still be large enough to impede motion, fracture rings, or both. Additionally, some self-lubricating materials may wear at a relatively greater rate, and some self-lubricating materials are brittle. Therefore, it may be desired to design rings with large aspect ratios in order to achieve adequate stiffness, strength, and wear capacity. Gas pockets added to sealing surfaces can reduce friction. Some considerations for implementing gas pockets are discussed below.

A first consideration concerns gas pockets reducing contact force by reducing net pressure-exposed area and contact area by the same amount. Consequently, gas pockets might not reduce local contact pressure at the remaining sealing surface. While this reduces the friction force acting on the ring as a whole, the local friction stress acting tangent to the surface remains high, which can still produce high stresses in the part and consequent failures.

Another consideration arises from the contact area of the seal, which can only be reduced so much before the seal no longer functions. Therefore, there is a practical limit to the size of pressure pocket (e.g., amount of recess) that can be added to the seal.

A further consideration is associated with devices, such as a linear generators, where a cylinder of the device may be filled with a homogenous mixture of air and fuel that may react in order to generate useful work. The gas pockets introduced to the assembly (e.g., via a ring assembly comprising features of the present disclosure) may constitute crevice volume. When a reaction attempts to propagate through a small space, such as a pocket in a sealing surface (e.g., between a ring surface and a piston surface), the rate of heat transfer out of the hot gas into the surrounding surfaces can exceed the rate of reaction exothermicity which may result in a quenched reaction. This crevice volume reduces system efficiency and is a source of hydrocarbon emissions. The higher the system pressure, the greater the density of the gas in these volumes, and the greater their impact. Gas pockets need not be included, or otherwise may be included to a lesser extent in some circumstances because although they reduce friction, they also add crevice volume.

Anti-Friction Features

In some embodiments, the present disclosure is directed to a method of patterning narrow gas feeds across a sealing surface in order to distribute gas into the contact interface of the sealing surfaces and reduce the friction applied by the contact.

Figure 6:
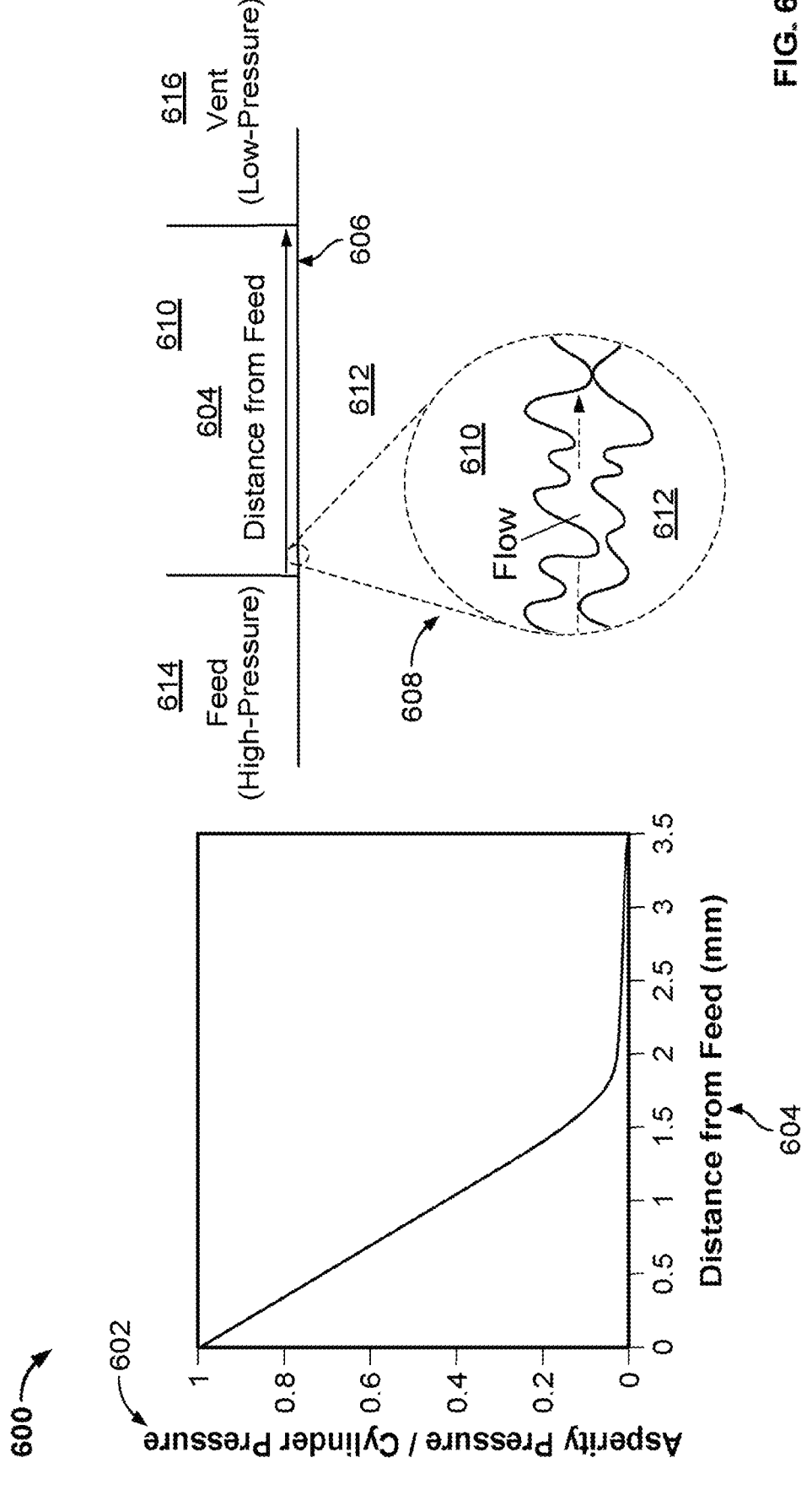
FIG. 6 shows simulated gas pressure between the asperities of a surface contact at the point of peak pressure in a linear generator cycle, in accordance with some embodiments of the present disclosure.

FIG. 6 depicts the flow of a gas from a high-pressure region into the space between two contacting surfaces. For example, the high-pressure region may be a in front of a ring and the space is between the ring and piston or cylinder, or the high pressure region may be within a gas feed or narrow channel in one face of a first contacting surface while the gas flows adjacent to the feed between a first contacting surface and a second contacting surface as further described below. Graph 600 illustrates a relationship between normalized gas pressure 602 (i.e., the ratio of asperity pressure to cylinder pressure) on the vertical axis and distance from feed 604 along sealing interface 606 on the horizontal axis, including focused view 608 depicting ring surface profile 610 and piston surface profile 612, in accordance with some embodiments of the disclosure. Any or all of the components, features, and elements depicted in or described in reference to FIG. 6 may be incorporated into any or all of FIGS. 1-5 and 7-19.

To illustrate, at a microscopic level, all sealing surfaces are comprised of contact between a series of nonuniform peaks, or asperities, and valleys (e.g., as shown in both of ring surface profile 610 and piston surface profile 612 within focused view 608). For example, even for sealing surfaces as smooth as 100 nm Ra, <10% of the surface area may actually be in contact. The remaining surface area may include valleys between contacting asperities. Fluid (e.g., gas from a high-pressure region) is able to flow through this void space, though the flow is restricted by the small dimensions of the channel. Graph 600 shows simulated gas pressure (e.g., as represented by normalized gas pressure 602) between the asperities of a surface contact at the point of peak pressure in a linear generator cycle, in accordance with some embodiments of the present disclosure. Graph 600 shows the result of a two-dimensional model of flow through the asperities in a sealing contact (e.g., along sealing interface 606). Gas pressure, at the moment of peak pressure in a linear generator cycle, is plotted as a function of normal distance from the high-pressure edge of the sealing surface in graph 600. In the illustrative example of the modeled geometry, the total seal length (e.g., high-pressure to low-pressure corresponding to distance from feed 604) is 3.5 mm. Further modeling and related investigation demonstrates that the penetration distance from high-pressure edge 614 (e.g., toward low-pressure edge 616) of the seal is a function of the surface roughness and upstream pressure (and time), as opposed to the available sealing length (e.g., corresponding to distance from feed 604). Moreover, if the surface is fed with pressurized gas from multiple directions, the pressure penetration length remains the same until the feeds become closer together than the penetration length. Thus, this penetration length can be considered to be a characteristic length of the system pressure profile and sealing surface roughness. It will be understood that while the abscissa of graph 600 ranges from 0-3.5 mm, any suitable geometry may be used in accordance with the present disclosure (e.g., the seal length may be less than or greater than 3.5 mm, with 3.5 mm being merely illustrative). Further, the seal length may be defined in any suitable way, and need not correspond to a zero asperity pressure (e.g., a seal metric may be defined that corresponds to about 2 mm in the context of FIG. 6).

The pressure penetration into the gap between the contact asperities locally decreases the contact pressure between the asperities themselves. The surfaces still remain in contact, but the force driving the ring into the sealing contact is shared locally between surface contact and gas pressure (e.g., the gas pressure exerts an outward force away from the interface in either direction on either surface). Thus, in some embodiments, friction is reduced while maintaining the In some embodiments, the present disclosure is directed to arrays having channels across a sealing surface used as a manifold for gas (e.g., from a high-pressure region) to flow into the interface. Given a known, constant characteristic length of pressure penetration normal to any channel, the spacing between the feeds dictates the fraction of that surface interface that is filled by pressurized gas. This in turn dictates the contact pressure and friction force at this surface (e.g., in the interface). Gas can be fed by channels of any suitable cross-section or by holes which perforate the sealing surface so long as the holes or channels are in communication with the high-pressure gas of the cylinder. Channels may be arrayed in parallel, in a grid, or any other suitable arrangement, and holes can be arranged in any pattern which controls the distance between sequential holes. The density of channels in a given area of the sealing surface dictates the local contact pressure and therefore the local friction force opposing ring segment motion. Channels or holes may be densely packed to minimize friction or placed further apart to allow greater friction (e.g., reduction in friction may be proportional to or otherwise dependent on the density of features at the interface).

Figure 7:
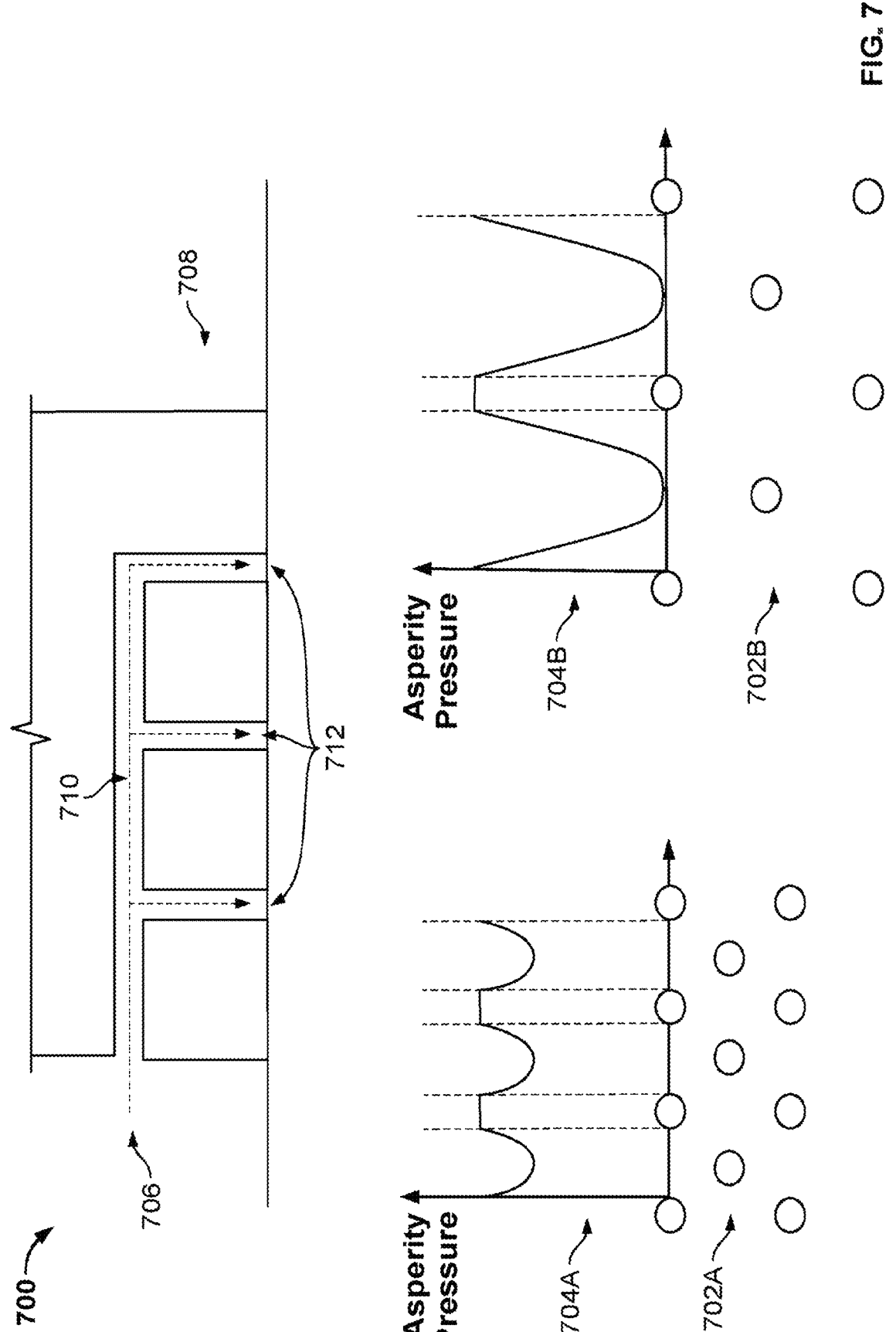
FIG. 7 shows two examples of through-hole feed patterns with different packing densities, in accordance with some embodiments of the present disclosure.

FIG. 7 depicts side view 700 of hole array 702A (e.g., a plurality of holes in an arrangement) corresponding to asperity pressure graph 704A illustrating the pressure distribution through one line of holes. while hole array 702B corresponds to asperity pressure graph 704B in a similar fashion, in accordance with some embodiments of the disclosure. Side view 700 may be exposed to circumstances which drive lubrication rates, wear rates, as well as material selection for various components and features of the present disclosure. Side view 700 may comprise more or fewer than the elements depicted in FIG. 7. Any or all of the components, features, and elements depicted in or described in reference to FIG. 7 may be incorporated into any or all of FIGS. 1-6 and 8-19.

Two examples of arrays of holes are shown in FIG. 7 with different pattern densities; for example, hole array 702 A corresponds to a condensed pattern and hole array 702B corresponds to a more spread out pattern. The through-hole feed patterns correspond to different packing densities, in accordance with some embodiments of the present disclosure. The pressure profiles for each pattern are also shown in each of asperity pressure graph 704A and asperity pressure graph 704B, at the point of peak pressure in the cycle, demonstrating the ability to tailor contact pressure by increasing feed density.

Side view 700 shows an illustrative downstream condition where high-pressure feed 706 feeds gas towards low-pressure vent 708. The low-pressure between feeds can be established in two ways. In some circumstances, flow 710 can proceed in one direction from high-pressure feed 706 to low-pressure vent 708. In such cases, the asperities closest to high-pressure feed 706 will always be at or near the cylinder pressure (e.g., pressure of the high-pressure region), and the asperities closest to low-pressure vent 708 will always be at ambient pressure (e.g., or otherwise at or near a pressure of the low-pressure region). In other circumstances, gas following flow 710 can fill asperities between two pressurized feeds (e.g., a pair of high-pressure feeds 706) without the use of low-pressure vent 708 for either feed. To illustrate, at the point of peak pressure, the pressure profiles of each of asperity pressure graph 704A and asperity pressure graph 704B may resemble that shown in FIG. 7, with lower pressure at a center location of the feeds (e.g., in between the feeds), and flow inwards from both directions (e.g., from the feeds/features to the rest of the contact interface). Under some operating conditions at the end of the cycle, a pressure of the gas in the high-pressure region may have dropped to ambient pressure or otherwise lower pressure and any pressurized gas still in the asperities is able to flow out (e.g., due to the pressure differential). To illustrate, the initial condition for the asperity gas pressure thus drops to ambient pressure or an otherwise low-pressure before the next compression of the high-pressure region. An aspect of the present disclosure is that any sealing interface must have an upstream and downstream condition by definition (e.g., the upstream and downstream pressures may be different or the same, and may vary in time). In some embodiments, an anti-friction pattern or feature includes at least one low-pressure vent (e.g., based on the downstream condition in the lower-pressure region. For example, the low-pressure region may extend up to or proximal to the sealing ring (or features thereof). Accordingly, the pressure difference of gas across the contact interface may change with time, over intra-cycle and/or inter-cycle time periods (e.g., during a stroke of a piston cycle, over time as peak pressures or minimum pressures changes, as compression/expansion changes, or as any other suitable operating parameter changes).

In an illustrative example, the cross-sectional area of channels 712 only need to be large enough that it does not restrict the gas flow more than the sealing contact itself (e.g., the seal is the primary restriction to flow). For example, the depth of a channel may be tailored to an expected wear (e.g., a wear rate) for a given sealing interface. For example, channels can be relatively narrow and shallow, which may yield several benefits.

For example, a first benefit may result where the contact surface area is minimally reduced, while still being supported by pressure fed into the contact. In some embodiments, the features of the present disclosure retain most of the contact surface area, and support it with a film of gas pressure. This reduces both average contact pressure for the surface and local contact pressure at any point on the surface which is within approximately one characteristic length of a high-pressure feed. By comparison, a large gas pocket reduces average contact pressure for the entire surface by proportionally reducing contact area and doesn't change the local contact pressure of the remaining contact interface.

In a further example, another benefit may result where the feeds of the present disclosure represent minimal or otherwise small gas volume and therefore contribute little to crevice volume in applications where the cylinder gas is comprised of premixed fuel and air.

Figure 8:
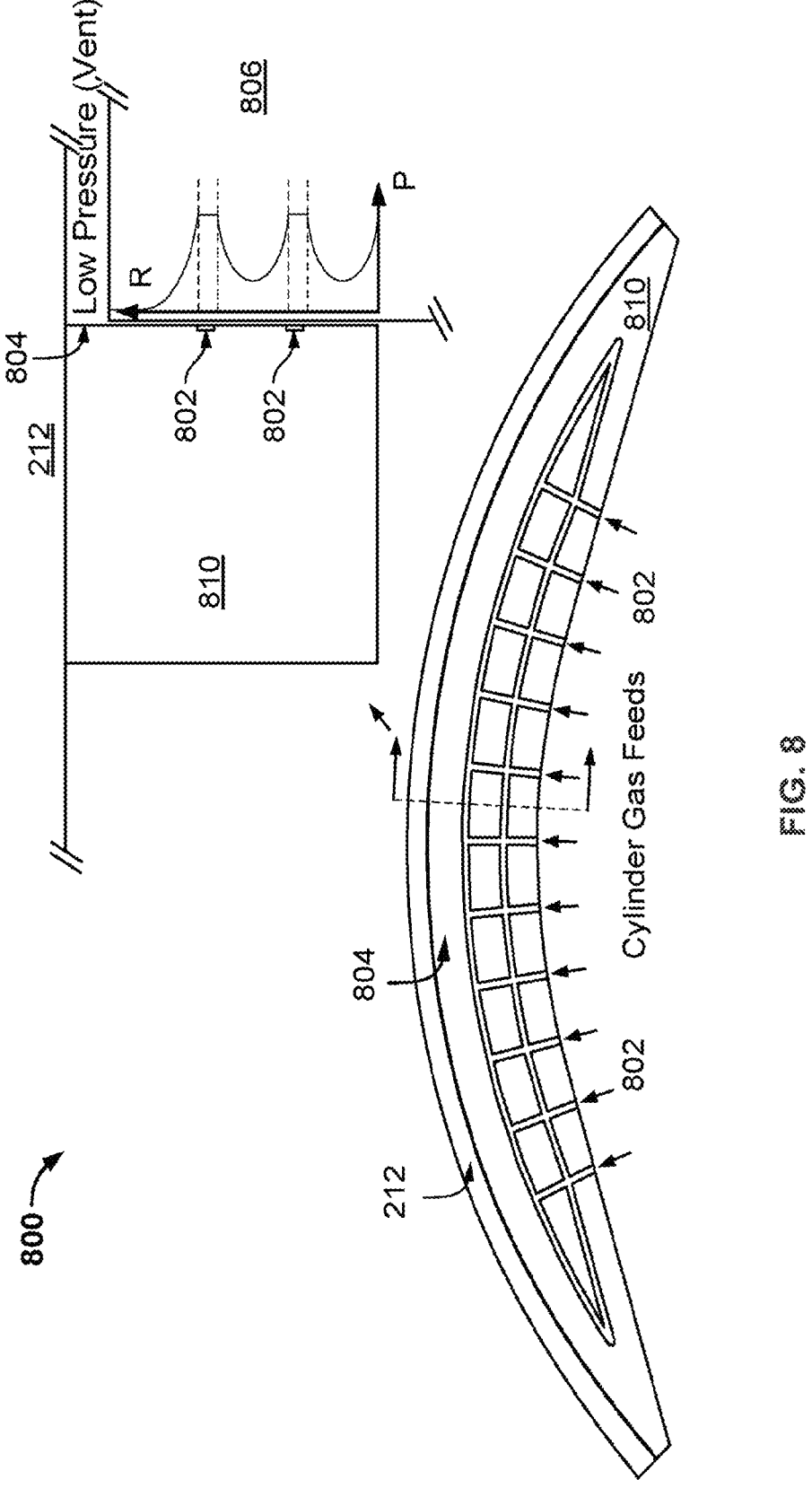
FIG. 8 shows an example of features applied at a ring-piston sealing interface, in accordance with some embodiments of the present disclosure.

FIG. 8 depicts assembly 800 wherein features 802 are arranged along ring surface 804, of ring segment 810, which is normal to cylinder wall 212, in accordance with some embodiments of the disclosure. Assembly 800 may be exposed to circumstances which drive lubrication rates as well as material selection for various components and features of the present disclosure. Assembly 800 may comprise more or fewer than the elements depicted in FIG. 8. Any or all of the components, features, and elements depicted in or described in reference to FIG. 8 may be incorporated into any or all of FIGS. 1-7, and 9-19.

Features 802 are arranged along ring surface 804, which contacts a piston surface (e.g., a piston land, not shown in FIG. 8) creating a ring-piston sealing interface. The end of surface contact 804 corresponds to an end or edge of the ring-piston sealing interface (e.g., a land of a ring groove of a piston). As illustrated, the pattern of features 802 is relatively uniform, and lowers the friction force on the piston surface to allow ring segment 810 comprised of features 802 to freely move radially outwards towards cylinder wall 212. Arranged to the right of ring surface 804 is graph 806, which depicts an asperity pressure graph for each of features 802 when exposed to pressurized gas while operating a piston in a cylinder comprised of cylinder wall 212 (e.g., in a manner similar to the graphs depicted in FIG. 7).

Figures 9A, 9B:
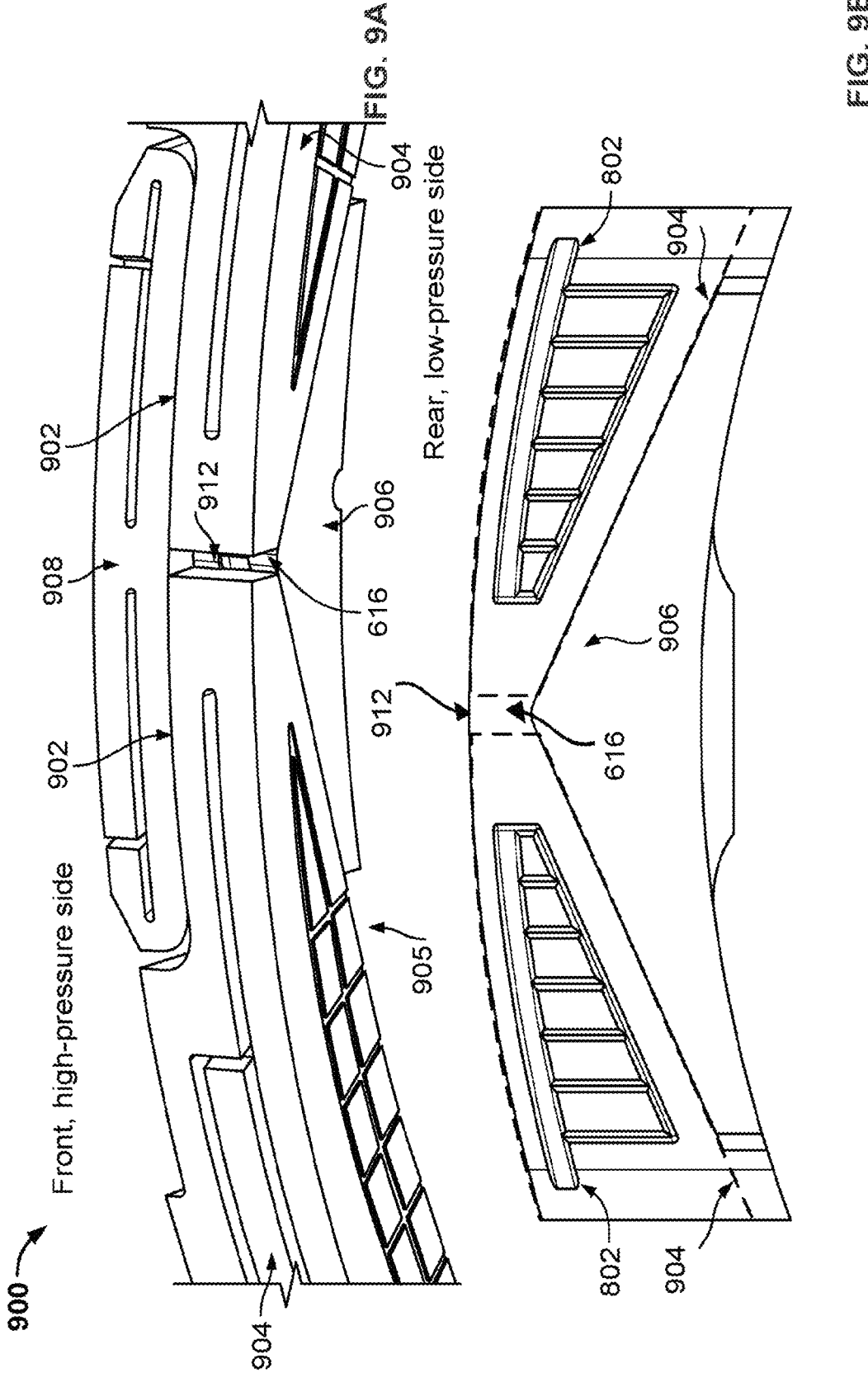
FIGS. 9A and 9B examples of features applied at the interface between two rings, in accordance with some embodiments of the present disclosure.

FIGS. 9A and 9B depict sealing assembly 900, in accordance with some embodiments of the disclosure. Sealing assembly 900 may be exposed to circumstances which drive lubrication rates as well as material selection for various components and features of the present disclosure. Sealing assembly 900 may comprise more or fewer than the elements depicted in FIG. 9. Any or all of the components, features, and elements depicted in or described in reference to FIG. 9 may be incorporated into any or all of FIGS. 1-8, 10, and 19.

As shown in FIG. 9A, sealing assembly 900 comprises ring segments 904 configured to interface with wedge 906 of ring segment 908. Ring segments 904 are arranged below ring segment 908. Ring segments 904 have a pattern of anti-friction features 905 for reducing friction between the ring segments 904 and a piston (not shown). Sealing interfaces 902 correspond to various seals created between each of ring segments 904 and a bottom surface of ring segment 908, as shown in FIG. 9B, which shows a bottom-view of FIG. 9A, but with the ring segments 904 removed, so that the bottom surface of ring segment 908; the outline of ring segments 904 is shown by the dotted lines in FIG. 9B Feed density may be tailored using a grid of features (e.g., features 802 of FIG. 8). Friction between the surfaces of ring segments 904 and 908, where each segment contacts (e.g., along contact surfaces 902) the other, corresponds to a location where friction can cause fractures in corresponding segments. Thus, a large portion of the contact surface between segment 908 and segments 904 is saturated with fed gas (e.g., communicated from a high-pressure region in front of ring segment 908), and care is taken to offset contact pressure with gas at the left and right tips of segment 908 almost entirely. This avoids a discontinuity in shear stress on the corresponding segment. Additionally, features 802 are configured to direct gas from the high-pressure region towards a low-pressure vent. For example, vent 912 is in fluid communication with the rear of the ring assembly 900 which is exposed to low pressure gas and, as such, is configured to communicate pressurized fluid (e.g., pressurized gas) between contact surfaces 902 along low-pressure edge 616.

Figure 10:
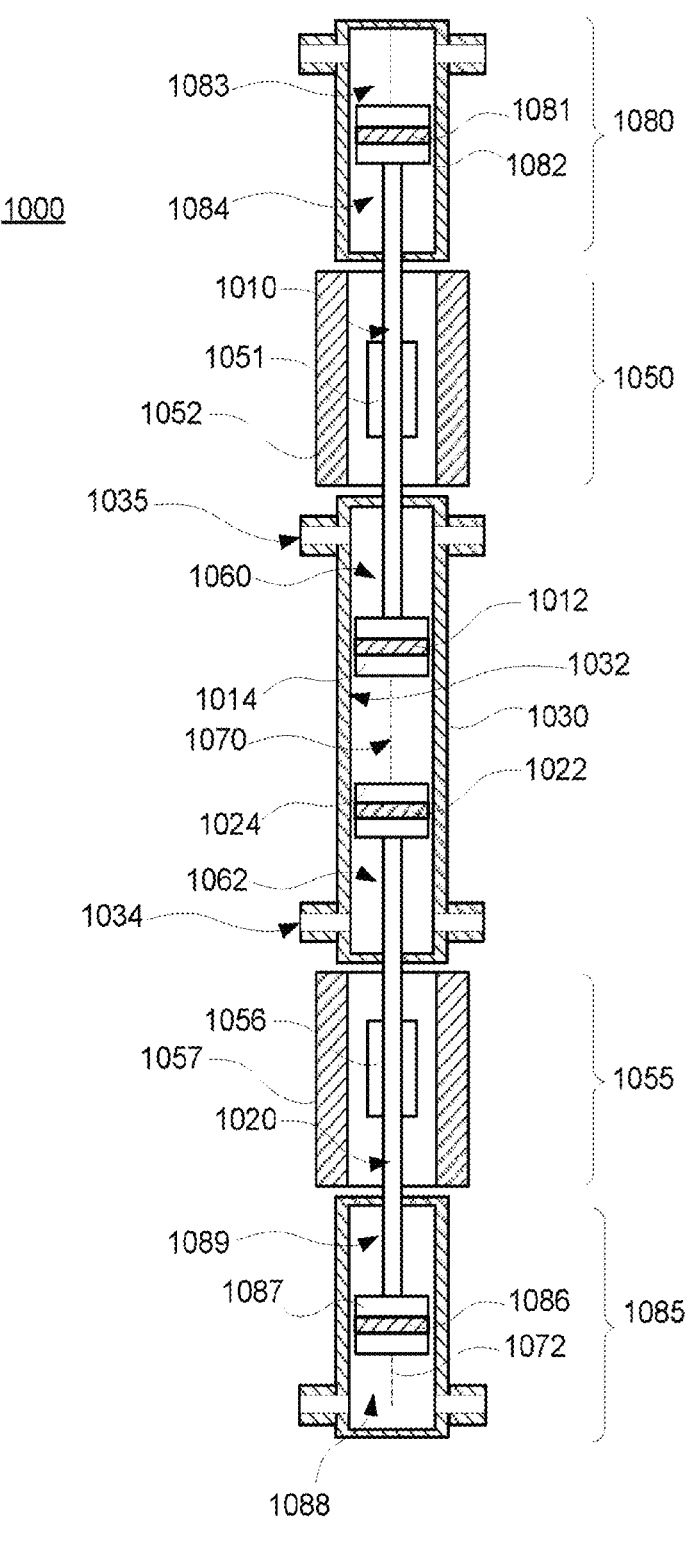
FIG. 10 shows a cross section view of an illustrative engine including two piston assemblies, that each include a sealing ring assembly in accordance with some embodiments of the present disclosure.

FIG. 10 shows a cross-sectional view of illustrative device 1000 including two free piston assemblies 1010 and 1020 that include respective sealing ring assemblies 1012 and 1022 in accordance with some embodiments of the present disclosure. In some embodiments, device 1000 may include linear electromagnetic machines 1050 and 1055 to convert between kinetic energy of respective free piston assemblies 1010 and 1020 and electrical energy. In some embodiments, device 1000 may include gas regions 1060 and 1062, which may, for example, be at a relatively lower pressure than gas region 1070 (e.g., a high-pressure region) for at least some, if not most, of a cycle (e.g., an engine cycle, or an air compression cycle). For example, gas regions 1060 and 1062 (e.g., low-pressure regions) may be open to respective breathing ducting (e.g., an intake manifold, an intake system, an exhaust manifold, an exhaust system). To illustrate, breathing ports 1034 and 1035 are configured to provide reactants to, and remove exhaust from, bore 1032 of cylinder 1030. In a further example, gas regions 1060 and 1062 may be vented to atmosphere (e.g., be at about 1.01 bar absolute pressure). In some embodiments, device 1000 may include gas springs 1080 and 1085, which may be used to store and release energy during a cycle in the form of compressed gas (e.g., a driver section). For example, free piston assemblies 1010 and 1020 may each include respective pistons 1082 and 1087, having grooves for respective sealing ring assemblies 1081 and 1086, to seal respective gas regions 1083 and 1088 (e.g., high-pressure regions) from respective gas regions 1084 and 1089 (e.g., low-pressure regions).

Cylinder 1030 may include bore 1032, centered about axis 1072. In some embodiments, free piston assemblies 1010 and 1020 may translate along axis 1072, within bore 1032, allowing gas region 1070 to compress and expand. For example, gas region 1070 may be at relatively high-pressure as compared to gas region 1060 for at least some of a stroke of free piston assemblies 1010 and 1020 (e.g., which may translate along axis 1072 in opposed piston synchronization). Sealing ring assemblies 1012 and 1022 may seal gas region 1070 from respective gas regions 1060 and 1062 within bore 1032. In some embodiments, free piston assemblies 1010 and 1020 may include respective pistons 1014 and 1024, and respective sealing ring assemblies 1012 and 1022 which may be arranged in respective corresponding grooves of pistons 1014 and 1024. It will be understood that gas regions 1060 and 1062, and gas region 1070, may change volume as free piston assemblies 1010 and 1020 move or are otherwise positioned at different locations along axis 1072. The portions of respective sealing ring assemblies 1012 and 1022 nearest gas region 1070 are each termed the front, and the portion of sealing ring assemblies 1012 and 1022 nearest respective gas regions 1060 and 1062 are each termed the rear. Sealing ring assemblies 1012 and 1022 may each include a high-pressure boundary, which may each depend on a pressure in gas region 1070. For example, a high-pressure boundary of sealing ring assembly 1012 may be open to gas region 1070 (e.g., coupled by one or more orifices, or other opening), and have a corresponding pressure the same as (e.g., if gas from gas region 1070 is unthrottled in the sealing ring assembly), or less than (e.g., if gas from gas region 1070 is throttled in the sealing ring assembly), the pressure of gas region 1070. Sealing ring assemblies 1012 and 1022 may each include a low-pressure boundary, which may depend on a gas pressure in respective gas regions 1060 and 1062. For example, a low-pressure boundary of sealing ring assembly 1012 may be open to gas region 1060 and have a corresponding pressure about the same as the pressure of gas region 1060. In some embodiments, as sealing ring assemblies 1012 and 1022 axially pass over respective ports 1035 and 1034 (e.g., and corresponding port bridges, although not shown), they may experience uneven, or reduced, inward force from bore 1032.

In some embodiments, pistons 1014 and 1024 may each include one or more grooves into which one or more respective sealing ring assemblies may be arranged. For example, as shown in FIG. 10, pistons 1014 and 1024 may each include one groove, into which sealing ring assembly 1012 and sealing ring assembly 1022 may be installed, respectively. In a further example, although not shown in FIG. 10, piston 1014 may include two grooves, in which two respective sealing ring assemblies may be installed. In a further example, piston 1014 may include two grooves, the first sealing ring assembly 1012, and the second (not shown), arranged to the rear of sealing ring assembly 1012, but with its front nearer to gas region 1060, thereby sealing pressure in gas region 1060 to pressure between the two sealing ring assemblies (e.g., which may be less than pressure in gas region 1070). Accordingly, a sealing ring assembly may be used to seal any suitable high-pressure and low-pressure regions from each other.

In some embodiments, free piston assemblies 1010 and 1020 may include respective magnet sections 1051 and 1056, which interact with respective stators 1052 and 1057 to form respective linear electromagnetic machines 1050 and 1055. For example, as free piston assembly 1010 translates along axis 1072 (e.g., during a stroke of an engine cycle), magnet section 1051 may induce current in windings of stator 1052. Further, current may be supplied to respective phase windings of stator 1052 to generate an electromagnetic force on free piston assembly 1010 (e.g., to effect motion of free piston assembly 1010).

In some embodiments, pistons 1014 and 1024, sealing ring assemblies 1012 and 1022, and cylinder 1030 may be considered a piston and cylinder assembly. In some embodiments, device 1000 may be an engine, an air compressor, any other suitable device having a piston and cylinder assembly, or any combination thereof. In some embodiments, device 1000 need not include two free piston assemblies. For example, cylinder 1030 could be closed (e.g., with a cylinder head), and free piston assembly 1010 alone may translate along axis 1072.

FIG. 11 depicts a block diagram of sealing method 1100 for forming a high-pressure region and a low-pressure region during operation of a linear generator at 1112, in accordance with some embodiments of the disclosure. Sealing method 1100 may be utilized under circumstances which drive lubrication rates as well as material selection for various components and features of the present disclosure. Sealing method 1100 may comprise more or fewer than the elements depicted in FIG. 11. Any or all of the components, features, and elements depicted in or described in reference to FIG. 11 may be incorporated into any or all of FIGS. 1-10 and 12-19.

Sealing method 1100 comprises forming a seal between a sealing element (e.g., a piston ring) and a bore of a cylinder without a liquid lubricant (e.g., for oil-less operation) at 1102. For example, the sealing element may include a self-lubricating material such as a ceramic (e.g., graphite), polymer, any other suitable material, with any suitable additive or aggregate, with any suitable reinforcement (e.g., metal or otherwise relatively less brittle material), or any combination thereof.

In some embodiments at 1104, the technique includes forming a seal between the sealing element and a ring groove of a piston. For example, the piston may include a circumferential groove having one or more lands (e.g., a rear land) against which the sealing element may form a seal.

In some embodiments at 1106, the technique includes moving at least one segment of the sealing element radially outward as the sealing element wears (e.g., against the bore). To illustrate, the sealing element may experience a force radially outward from gas of the high-pressure region, a spring element, or a combination thereof to maintain a seal against the bore. In some embodiments, wherein the sealing element is formed from a self-lubricating material, the sealing element may wear against the bore, thus changing the shape, size, or position of the sealing element over time.

In some embodiments at 1108, the technique includes allowing gas from a high-pressure region to occupy at least some of an interface between segments of the sealing element (e.g., more than one segment) or portions of a sealing element (e.g., a single segment). For example, features in either or both segments or portions of the sealing element may allow gas to flow and pressurize the interface (e.g., by occupying asperities thereof).

In some embodiments at 1110, the technique includes allowing gas from a high-pressure region to occupy at least some of an interface between the sealing element and the ring groove of the piston. For example, features in either or both the sealing element or the ring groove may allow gas to flow and pressurize the interface (e.g., by occupying asperities thereof).

Pressure Compensation Features

For economic reasons, it is desirable for a seal of a piston-cylinder assembly to function for as long as possible before needing replacement. For example, a typical target is hundreds or thousands of hours of operation. During these run hours the seal wears down radially, and gaps may form between portions of the seal. The total circumferential arc length of the resulting gap(s) opens by $2*pi*$the radial wear of the seal. With a self-lubricating material in which the wear rate is relatively high, the gap opens by an amount that results in unacceptable leakage flow, thus limiting the effective operating life of the seal.

In some embodiments, the present disclosure is directed to a sealing ring assembly including a first ring and a second ring. The first ring includes an extension extending axially rearwards, and the extension includes a radially outward surface. The second ring includes an inner radial surface configured to interface with the radially outward surface of the extension. The sealing ring assembly also includes a groove extending circumferentially along at least one of the radially outward surface of the extension and the inner radial surface of the second ring.

the groove is configured to be open to a low-pressure boundary of the sealing ring assembly. The second ring includes a pocket that extends azimuthally in an outermost radial surface of the second ring. The pocket is configured to receive gas from a high-pressure boundary of the sealing ring assembly. In some embodiments, the second ring includes an orifice that is configured to allow gas to flow from the high-pressure boundary to the pocket.

In some embodiments, the sealing ring assembly is configured to be arranged in a ring groove of a piston. The piston includes an anti-rotation relief, and the sealing ring assembly comprises an anti-rotation tab that engages with the anti-rotation relief to prevent substantial azimuthal movement of the sealing ring assembly. The first ring includes an outermost radial surface, and the radially outward surface of the extension is radially inward of the outermost radial surface. At least one of the first ring and the second ring includes a self-lubricating material. For example, in some embodiments, the first ring, the second ring, or both are made from graphite. In some embodiments, the sealing ring assembly is configured for operation without liquid lubricant. For example, in some embodiments, the sealing ring assembly is configured for oil-less operation.

In some embodiments, the first ring includes at least two first ring segments. The at least two first ring segments are arranged such that respective ends of the at least two first ring segments form at least one interface between each other. The second ring may also include at least two second ring segments. The at least two second ring segments are arranged such that respective ends of the at least two second ring segments form at least one interface between each other.

Figure 12:
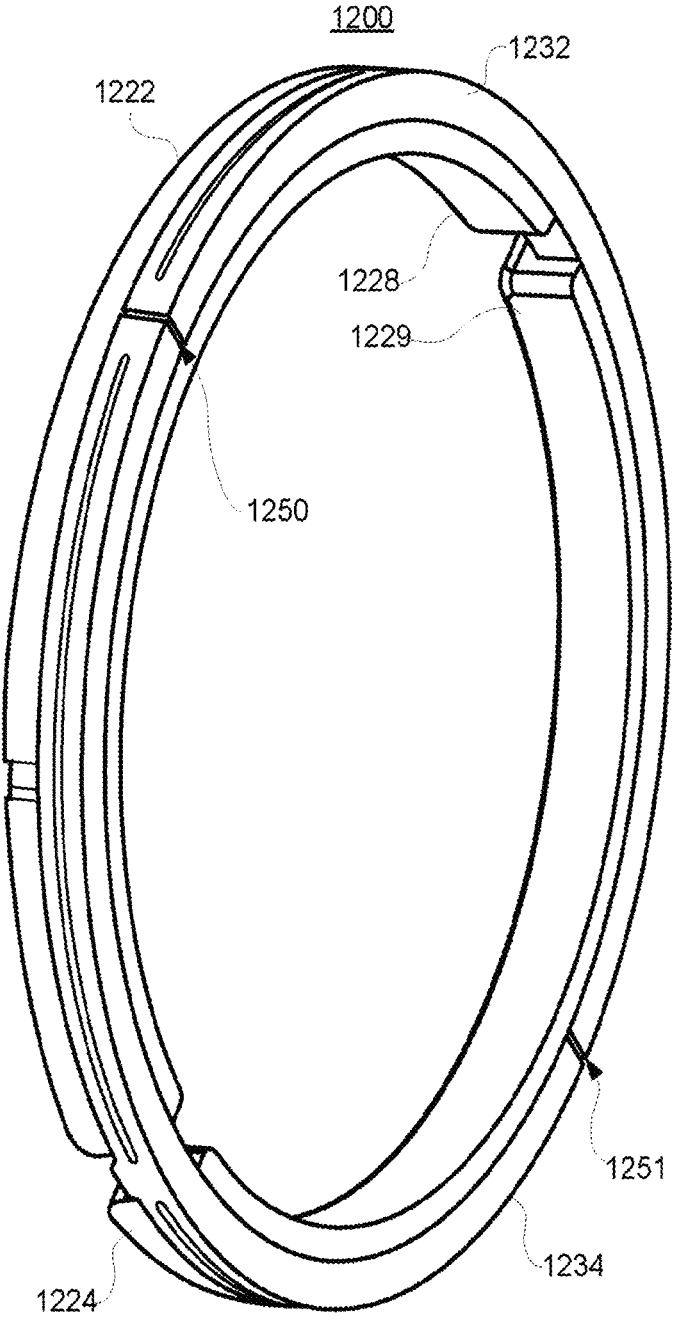
FIG. 12 shows a perspective view of an illustrative sealing ring assembly, in accordance with some embodiments of the present disclosure.

FIG. 12 shows a perspective view of illustrative sealing ring assembly 1200, in accordance with some embodiments of the present disclosure. Sealing ring assembly 1200 includes first ring segments 1222 and 1224, and second ring segments 1232 and 1234. Second ring segments 1232 and 1234 are arranged radially outward of extensions 1228 and 1229 of respective first ring segments 1222 and 1224. Gaps 1250 and 1251 are between second ring segments 1232 and 1234. For example, as sealing ring assembly 1200 wears, gaps 1250 and 1251 may widen.

Figures 13, 14:
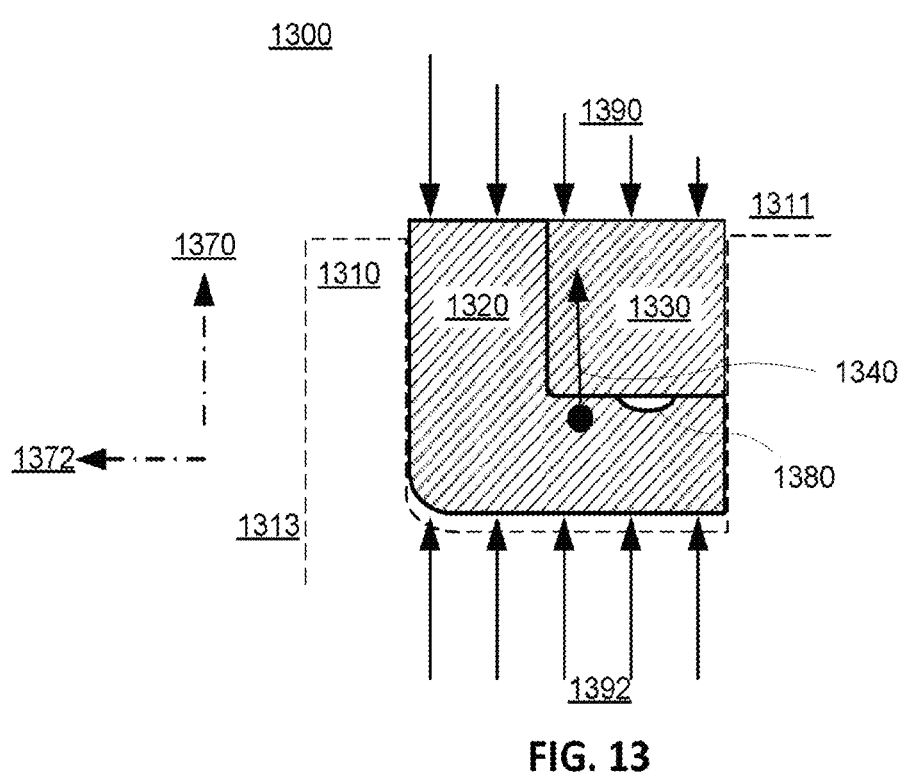
FIG. 13 shows a cross section view of an illustrative sealing ring assembly including a feature for pressure locking, in accordance with some embodiments of the present disclosure.
FIG. 14 shows a cross section view of an illustrative sealing ring assembly including a feature for pressure locking and a feature for balancing radial forces, in accordance with some embodiments of the present disclosure.

FIG. 13 shows a cross section view of illustrative sealing ring assembly 1300 including a feature for pressure locking (i.e., groove 1380), in accordance with some embodiments of the present disclosure. Sealing ring assembly 1300 is configured to be arranged in a ring groove of piston 1310.

The feature for pressure locking (i.e., groove 1380, as shown illustratively in FIG. 13) may aid in maintaining sealing ring assembly 1300 in an intended configuration during operation, which is referred to herein as pressure locking. During operation (e.g., in a device including a piston and cylinder assembly), groove 1380 may be configured to include gas at a pressure close to a pressure of a low-pressure boundary of sealing ring assembly 1300. For example, during operation, groove 1380 may achieve, or nearly achieve, a pressure of a low-pressure region (e.g., low-pressure region 1311) at the rear of sealing ring assembly 1300.

To illustrate, in the absence of groove 1380, as the "twin ring" (e.g., sealing ring assembly 1300) wears, rear ring 1330 (e.g., a second ring) may tend to wear at a faster rate than front ring 1320 (e.g., a first ring). This is due to the pressure dropping axially along the axial length of sealing ring assembly 1300 (e.g., dropping from left to right as illustrated by the top arrows 1390 pointing downwards). Accordingly, the pressure on the outside of the rear ring is lower than the peak pressure. If pressure gets between the front ring 1320 and rear ring 1330 (e.g., and thus exposes the rear segments to a pressure of the high-pressure region) rear ring 1330 will then tend to be more strongly biased radially outwards than front ring 1320. As rear ring 1330 wears at a greater rate, a gap between the rear ring segments will open. Gas from the high-pressure region then more easily gets between the segments, increasing the outward force, and a runaway condition may occur. Further, the flow of gas from high pressure region 1313 into the gap may be characterized as leaking past the seal.

In some embodiments, a groove (e.g., groove 1380) is formed (e.g., cut) in one of the rings at the radial interface between front ring 1320 and rear ring 1330. As illustrated in FIG. 13, the groove 1380 is formed in front ring 1320, although it may be formed in either or both rings at their interface. The groove 1380 may be included in the interface at the outer surface of front ring 1320, the inner surface of rear ring 1330, or both. In some embodiments, the groove 1380 is centered on, and open to, a split in rear ring 1330. The ends of groove 1380 are closed before reaching the split in front ring 1320. When the sealing ring assembly is in operation (e.g., in a piston-cylinder device), the split in rear ring 1330 is at low pressure because it is open to the rear of sealing ring assembly 1300 and is closed off from the front of sealing ring assembly 1300. For example, this is illustrated by gaps 1250 and 1251 between second ring segments 1232 and 1234 of FIG. 12, which couple the grooves to a low-pressure region. Therefore, groove 1380 between the two rings is also at low pressure, ensuring a low pressure between the front and rear segments which helps in them staying radially locked together.

Illustrative radial pressure fields 1390 (i.e., acting radially inward) and 1392 (i.e., acting radially outward) may act on sealing ring assembly 1300 during operation. Radial pressure field 1392 is directed radially outward and is created by gas from a high-pressure region acting on the radially inner surface of sealing ring assembly 1300. Radial pressure field 1390 is directed radially inward and is created by gas in the clearance between sealing ring assembly 1300 and a corresponding bore of a cylinder. The shape of the pressure fields along the axial direction is intended for illustrative purposes only and may vary depending on the properties of the contact between the sealing ring assembly and the cylinder bore. The resultant force 1340 is directed radially outward, pushing sealing ring assembly 1300 radially outward. The magnitude of resultant force 1340 may impact a wear rate of sealing ring assembly 1300. For example, a larger resultant force may cause a larger normal force of a sealing ring assembly against a bore, which during motion of the sealing ring assembly may lead to increased friction force. Accordingly, increased friction work may result in increased wear on the sealing ring assembly.

FIG. 14 shows a cross section view of illustrative sealing ring assembly 1400 including a feature for pressure locking (i.e., groove 1480, as shown illustratively in FIG. 14) and a feature for balancing radial forces (i.e., groove 1460, as shown illustratively in FIG. 14, which may also be structured as a pocket depending on the view and construction of the sealing ring assembly), in accordance with some embodiments of the present disclosure. Coordinate axes 1470 (i.e., radial), and 1472 (i.e., axial) are provided in FIG. 14 for purposes of clarity. Sealing ring assembly 1400 includes front ring 1420 and rear ring 1430. Sealing ring assembly 1400 is configured to be arranged in a ring groove of piston 1410.

The feature for pressure locking (i.e., groove 1480, as shown illustratively in FIG. 14) may aid in maintaining sealing ring assembly 1400 in an intended configuration during operation, which is referred to herein as pressure locking. During operation (e.g., in a device including a piston and cylinder assembly), groove 1480 may be configured to include gas at a pressure close to a pressure of a low-pressure boundary of sealing ring assembly 1400. For example, during operation, groove 1480 may achieve, or nearly achieve, a pressure of a low-pressure region at the rear of sealing ring assembly 1400 (e.g., to the right in FIG. 14).

Illustrative radial pressure fields 1490 (i.e., acting radially inward) and 1492 (i.e., acting radially outward) may act on sealing ring assembly 1400 during operation. Radial pressure field 1492 is directed radially outward and is created by gas from a high-pressure region acting on the radially inner surface of sealing ring assembly 1400. Radial pressure field 1490 is directed radially inward and is created by gas in the clearance between sealing ring assembly 1400 and a corresponding bore of a cylinder. The shape of the pressure fields along the axial direction is intended for illustrative purposes only and may vary depending on the properties of the contact between the sealing ring assembly and the cylinder bore. Radial pressure field 1490 is relatively larger than radial pressure field 1390 (e.g., as shown in FIG. 13), under similar conditions, due to groove 1460 which allows high pressure gas to flow and affect radial pressure field 1490. The resultant force 1440 is directed radially outward, pushing sealing ring assembly 1400 radially outward. The magnitude of resultant force 1440 is larger than resultant force 1340 (e.g., as shown in FIG. 13). This is because, for example, radial pressure fields 1392 and 1492 are substantially similar, but the inward force from radial pressure field 1390 is less than the inward force from radial pressure field 1490 (e.g., when radial pressure fields are integrated over the surface).

In some embodiments, the farther towards the rear (axially) of sealing ring assembly 1400 that groove 1460 is located, the more resultant force 1440, and hence wear, may be reduced. There are practical limitations, however, to how close to the rear (axially) of sealing ring assembly 1400 that groove 1460 may be located. This may be due to the strength of the ring, increased leakage, or both. In some embodiments, groove 1460 may be located in the rear half of sealing ring assembly 1400, axially. For example, in some embodiments, the center of groove 1460 may be located between 50% and 80% of the axial length of sealing ring assembly 1400 from the front face (e.g., face 1439). It will be understood that the pocket location may be located at any suitable axial position (e.g., centered about any suitable axial position).

In some embodiments, to help reduce wear, groove 1460 may cover as much of the circumferential extent of sealing ring assembly 1400 as possible. However, in some embodiments, groove 1460 does not intersect the splits in the sealing ring assembly (e.g., which may cause increased gas leakage and a poorer seal). For example, in some embodiments, groove 1460 may extend most, but not all, of the way around sealing ring assembly 1400. In some embodiments the gas entering the contact surface between the sealing ring assembly and the cylinder wall may build up pressure slowly relative to the rate of the pressure rising and falling in the high pressure region. In this case, multiple pockets can be arrayed axially (or circumferentially for pockets that run along the axial axis) to reduce the distance the gas must flow along the surface and increase the effectiveness of the pattern at offsetting the resultant radially outwards force.

In some embodiments, groove 1460 can be pressurized at, or near to, the pressure of a high-pressure region. In some embodiments, a hole or other passage (e.g., passage 1461) may be formed (e.g., drilled) axially through sealing ring assembly 1400, thus connecting groove 1460 to an axially front face of the sealing ring assembly 1400.

Figures 15, 16:
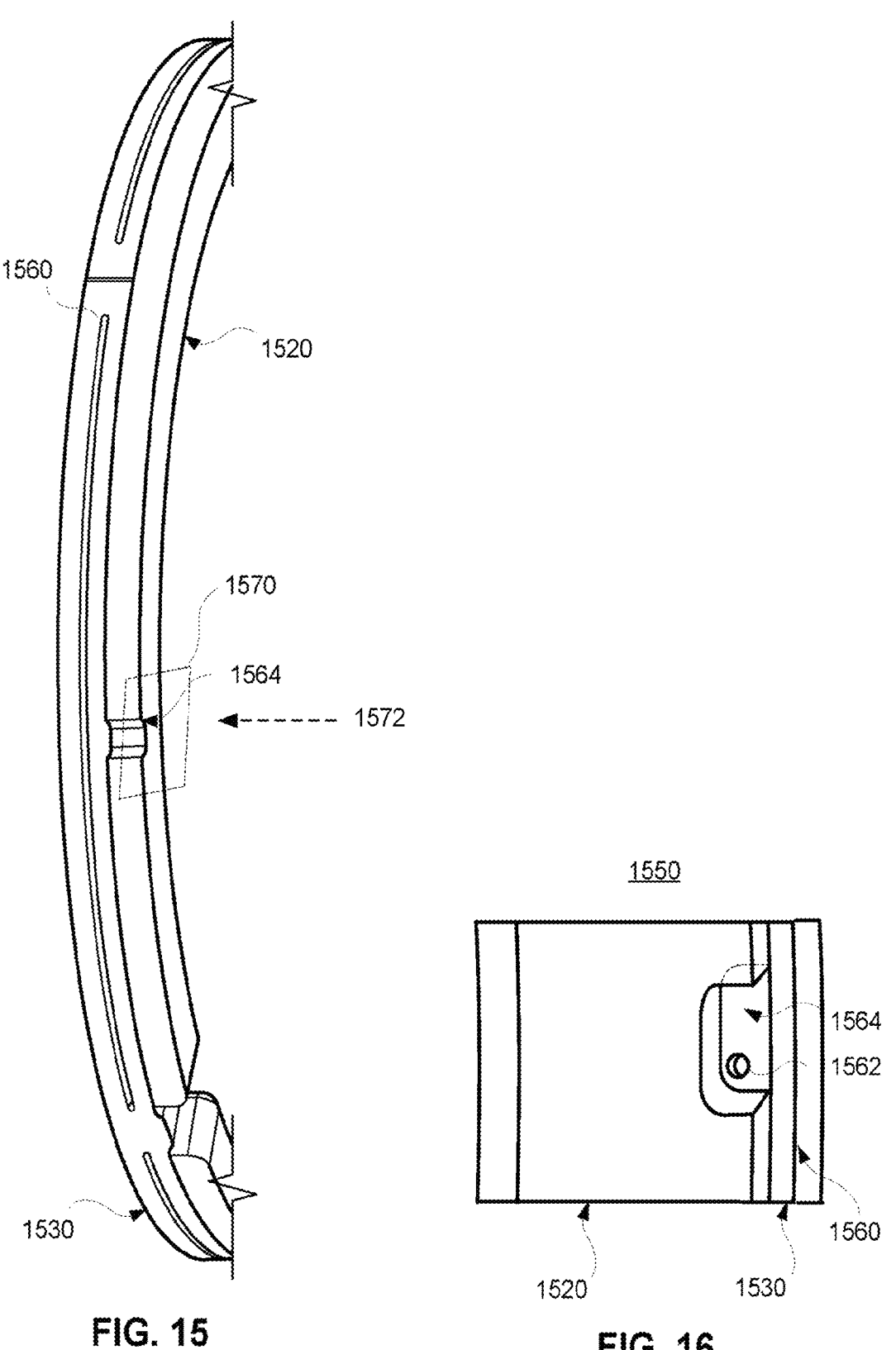
FIG. 15 shows a perspective view of a portion of an illustrative sealing ring assembly including a feature for balancing radial forces, in accordance with some embodiments of the present disclosure.
FIG. 16 shows a perspective view of a portion of the illustrative sealing ring assembly of FIG. 13, including a feature for balancing radial forces, in accordance with some embodiments of the present disclosure.

FIG. 15 shows a perspective view of a portion of illustrative sealing ring assembly 1500 including a feature for balancing radial forces 1560, in accordance with some embodiments of the present disclosure. Sealing ring assembly 1500 includes first ring 1520 and second ring 1530. Second ring 1530 includes pocket 1560, which extends circumferentially in an outer radial surface of the second ring. In some embodiments, pocket 1560 is configured to receive high pressure gas (e.g., from a high-pressure region of a piston cylinder device). In some embodiments, second ring 1530 may include orifice 1562, which may allow gas to flow from a high-pressure boundary of sealing ring assembly 1500 to pocket 1560. First ring 1520 may include recess 1564, or other feature, to allow orifice 1562 to receive high pressure gas during operation. Orifice 1562 may include a hole, passage, or other opening which may allow suitable gas flow.

FIG. 16 shows a perspective view of portion 1550 of illustrative sealing ring assembly 1500 of FIG. 15, in accordance with some embodiments of the present disclosure. Portion 1550 is shown by section 1570 of FIG. 15, viewed in direction 1572. Recess 1564 in first ring 1520 allows a relatively open flow path for high-pressure gas to enter orifice 1562. Accordingly, in some circumstances, sealing ring assembly 1500 may be configured to seal between a high-pressure region and a low-pressure region, and exhibit relatively lower wear (e.g., as compared to sealing ring assembly 1300 of FIG. 13) because of pocket 1560 for radial pressure balancing (e.g., similar to sealing ring assembly 1100 of FIG. 11). Under some circumstances, first ring 1520 and second ring 1530 may move azimuthally relative to one another as sealing ring assembly 1500 wears. Accordingly, recess 1564 may include a slot (e.g., as shown in FIG. 13) rather than a circular hole, such that the pressurization pathway remains open as the ring wears.

Pressure Locking Features

In some embodiments, the present disclosure is directed to a sealing ring assembly. The sealing ring assembly includes a first sealing element having a first mating surface. The sealing ring assembly also includes a second sealing element having a second mating surface. The sealing ring assembly also includes a high-pressure boundary extending across at least a portion of the first sealing element and across at least a portion of the second sealing element. The sealing ring assembly also includes a low-pressure boundary extending across at least a portion of the first sealing element and across at least a portion of the second sealing element. At least one of the first mating surface and the second mating surface includes a recess open to the low-pressure boundary and not open to the high-pressure boundary, such that the first mating surface is sealed against the second mating surface by a first force acting on the first sealing element and a second force acting on the second sealing element. In some embodiments, the first force acting on the first sealing element is directed opposite to the second force acting on the second sealing element.

In some embodiments, the recess is configured to cause the first and second forces to maintain a relative position of the first sealing element and the second sealing element. The first mating surface is sealed against the second mating surface in at least one of the radial, axial, and azimuthal direction. For example, the first and second surfaces may be flat, angled, curved, compound, or a combination thereof and may seal against each other in one or more directions at all, of or part of, the interface. The sealing ring assembly includes a rear axial face configured to seal against a land of a piston. In some embodiments, the sealing ring assembly includes a radially outer face configured to seal against a bore of a cylinder between the high-pressure boundary and the low-pressure boundary.

In some embodiments, the recess includes a groove. The recess may be a first recess of the first mating surface, and wherein the second mating surface includes a second recess configured to interface with the first recess. The first sealing element includes a first ring segment, and the second sealing element includes a second ring segment. In some embodiments, the first sealing element includes a ring segment, and the second sealing element includes a gap cover element. At least one of the first and second sealing elements includes a radial pressure-balancing feature configured to cause a radially inward force. For example, in some embodiments, the radially inward force reduces wear of the sealing ring assembly. In some embodiments, the first and second mating surfaces seal against each other to prevent the recess from being open to the high-pressure boundary.

In some embodiments, the present disclosure is directed to a piston assemble including a piston and a sealing ring assembly. The piston includes a circumferential groove, and the piston is configured to move axially within a bore of a cylinder. The sealing ring assembly is arranged in the circumferential groove and is configured to seal against the bore. The sealing ring assembly includes a first sealing element having a first mating surface and a second sealing element having a second mating surface. The sealing ring assembly also includes a high-pressure boundary extending across at least a portion of the first sealing element and across at least a portion of the second sealing element, and a low-pressure boundary extending across at least a portion of the first sealing element and across at least a portion of the second sealing element. At least one of the first mating surface and the second mating surface includes a recess open to the low-pressure boundary and not open to the high-pressure boundary such that the first mating surface is sealed against the second mating surface by a first force acting on the first sealing element and a second force acting on the second sealing element.

In some embodiments, the present disclosure is directed to a device including a cylinder, a piston, and a sealing ring assembly. The cylinder includes a bore having a high-pressure region and a low-pressure region. The piston includes a circumferential groove, and the piston is configured to move axially within the bore. The sealing ring assembly is arranged in the circumferential groove and is configured to seal against the bore to define the high-pressure region and the low-pressure region. The sealing ring assembly includes a first sealing element having a first mating surface and a second sealing element having a second mating surface. At least one of the first and second mating surfaces includes a recess open to the low-pressure region and not open to the high-pressure region, such that the first mating surface is sealed against the second mating surface by a first force acting on the first sealing element and a second force acting on the second sealing element.

In some embodiments, the circumferential groove includes an axially rear land, and the sealing ring assembly is configured to seal against the axially rear land. The first force acting on the first sealing element is directed opposite to the second force acting on the second sealing element. The recess is configured to cause the first and second forces to maintain a relative position of the first sealing element and the second sealing element. The sealing ring assembly includes a radially outer face configured to seal against the bore.

In some embodiments, the sealing ring assembly includes a first boundary extending across at least a portion of the first sealing element and at least a portion of the second sealing element, and that is open to the high-pressure region. In some embodiments, the sealing ring assembly also includes a second boundary extending across at least a portion of the first sealing element and at least a portion of the second sealing element, and that is open to the low-pressure region, wherein the recess is open to the first boundary and not open to the second boundary.

In some embodiments, the present disclosure is directed to a sealing ring assembly including a first ring and a second ring. The first ring includes an extension extending axially rearwards, which includes a radially outward surface. The second ring includes an inner radial surface configured to interface to the radially outward surface. The sealing ring assembly also includes a groove extending circumferentially along at least one of the radially outward surface of the extension and the inner radial surface of the second ring. For example, the groove may be included in either or both of the first ring and the second ring. In some embodiments, the groove is configured to be open to a low-pressure boundary of the sealing ring assembly.

In some embodiments, the second ring includes a pocket that extends circumferentially in an outermost radial surface of the second ring, and wherein the pocket is configured to receive high pressure gas. For example, the outermost radial surface is configured to seal against a bore of a cylinder. The second ring includes an orifice that is configured to allows gas to flow from the high-pressure boundary to the pocket. In some embodiments, for example, the second ring includes an orifice, slot, or other through feature. The sealing ring assembly is configured to be arranged in a ring groove of a piston. The sealing ring assembly includes an anti-rotation feature to prevent substantial azimuthal movement of the sealing ring assembly.

In some embodiments, the first ring includes an outermost radial surface, and herein the outer radial surface of the extension is radially inward of the outer radial surface. For example, the outermost radial surface is configured to seal against the bore of the cylinder. In some embodiments, at least one of the first ring and the second ring includes a self-lubricating material. For example, the first ring, the second ring, or both may include graphite or other ceramic, a polymer, or a combination thereof. In some embodiments, the sealing ring assembly is configured for operation without liquid lubricant. For example, in some embodiments, the sealing ring assembly is configured for oil-less operation. The first ring includes at least two first ring segments, which are arranged such that respective ends of the at least two first ring segments form at least one interface between each other. The second ring comprises at least two second ring segments, which are arranged such that respective ends of the at least two second ring segments form at least one interface between each other.

In some embodiments, the present disclosure is directed to a piston assembly including a piston and a sealing ring assembly. The piston includes a ring groove. The sealing ring assembly is arranged in the ring groove and includes a first ring and a second ring. The first ring includes an extension extending axially rearwards, which includes a radially outward surface. The second ring includes radially inner surface configured to interface to the radially outward surface of the extension. The sealing ring assembly also includes a groove extending azimuthally along at least one of the radially outer surface of the extension and the inner radial surface of the second ring. In some embodiments, the piston is an open-faced piston.

In some embodiments, the present disclosure is directed to a device including a cylinder, a piston, and a sealing ring assembly. The cylinder includes a bore. The piston includes a ring groove and is configured to travel within the bore along an axis of the bore. The sealing ring assembly is arranged in the ring groove and includes a first ring and a second ring. The first ring includes an extension extending axially rearwards, which includes a radially outward surface. The second ring includes an inner radial surface configured to interface to the radially outward surface. The sealing ring assembly also includes a groove extending azimuthally along at least one of the radially outer surface of the extension and the inner radial surface of the second ring. In some embodiments, the sealing ring assembly is configured to seal between the bore and the piston. For example, the sealing ring assembly is configured to seal a high-pressure region in the bore from a low-pressure region in the bore.

Figure 17:
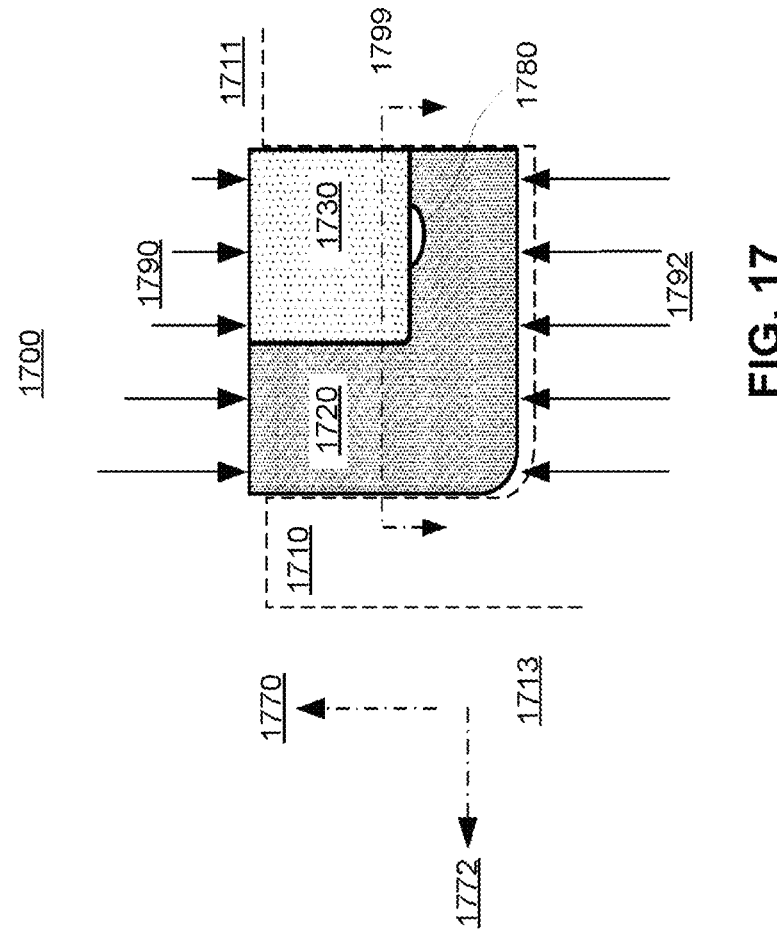
FIG. 17 shows a cross section view of an illustrative sealing ring assembly including a feature for pressure locking, in accordance with some embodiments of the present disclosure.

FIG. 17 shows a cross section view of illustrative sealing ring assembly 1700 including a feature for pressure locking, in accordance with some embodiments of the present disclosure. Coordinate axes 1770 (i.e., radial) and 1772 (i.e., axial) are provided in FIG. 17 for purposes of clarity. Sealing ring assembly 1700 is configured to be arranged in a ring groove of piston 1710.

The feature for pressure locking (i.e., groove 1780, as shown illustratively in FIG. 17) may aid in maintaining sealing ring assembly 1700 in an intended configuration during operation, which is referred to herein as pressure locking. During operation (e.g., in a device including a piston and cylinder assembly), groove 1780 may be configured to include gas at a pressure close to a pressure of a low-pressure boundary of sealing ring assembly 1700. For example, during operation, groove 1780 may achieve, or nearly achieve, a pressure of a low-pressure region (e.g., low-pressure region 1711) at the rear of sealing ring assembly 1700. Although groove 1780 is illustrated as integral to front ring 1720, groove 1780 could also be included in rear ring 1730, or both front ring 1720 and rear 1730. Further, groove 1780 may be replaced with any suitable recess configured to apply pressure to suitable faces of the sealing ring assembly. For example, a recess may include any suitable shape, having any suitable geometric properties, in accordance with the present disclosure.

To illustrate, in the absence of groove 1780, as the "twin ring" (e.g., sealing ring assembly 1700) wears, rear ring 1730 may tend to wear at a faster rate than front ring 1720. This is due to the pressure dropping axially along the axial length of sealing ring assembly 1700 (e.g., dropping from left to right as illustrated by the top arrows 1790 pointing down). Accordingly, the pressure on the outside of the rear ring is lower than the peak pressure (e.g., in high-pressure region 1713). If high pressure gas gets between the front ring 1720 and rear ring 1730 (e.g., and thus exposes the rear segments of ring 1730 to a pressure of high-pressure region 1713) rear ring 1730 will then tend to be more strongly biased radially outwards than front ring 1720. As rear ring 1730 wears at a greater rate, a gap between the rear ring segments will open. Gas from the high-pressure region then more easily gets between the segments, increasing the outward force, and a runaway condition may occur. Further, the flow of gas from high pressure region 1713 into the gap may be characterized as leaking past the seal.

In some embodiments, a groove (e.g., groove 1780) is formed (e.g., cut) in one of the rings at the radial interface between front ring 1720 and rear ring 1730. The groove may be included in the interface at the outer surface of front ring 1720, the inner surface of rear ring 1730, or both. In some embodiments, the groove is centered on, and open to, a split in rear ring 1730. The ends of groove 1780 are closed before reaching the split in front ring 1720. When sealing ring assembly 1700 is in operation (e.g., in a piston-cylinder device), the split in rear ring 1730 is at low pressure because it is open to the rear of sealing ring assembly 1700 and closed off from the front of sealing ring assembly 1700. Therefore, groove 1780 between the two rings is also at low pressure, ensuring a low pressure between the front and rear segments which helps in them staying radially locked together.

Illustrative radial pressure fields 1790 (i.e., acting radially inward) and 1792 (i.e., acting radially outward) may act on sealing ring assembly 1700 during operation. Radial pressure field 1792 is directed radially outward and is created by gas from a high-pressure region acting on the radially inner surface of sealing ring assembly 1700. Radial pressure field 1790 is directed radially inward and is created by gas in the clearance between sealing ring assembly 1700 and a corresponding bore of a cylinder.

Figure 18:
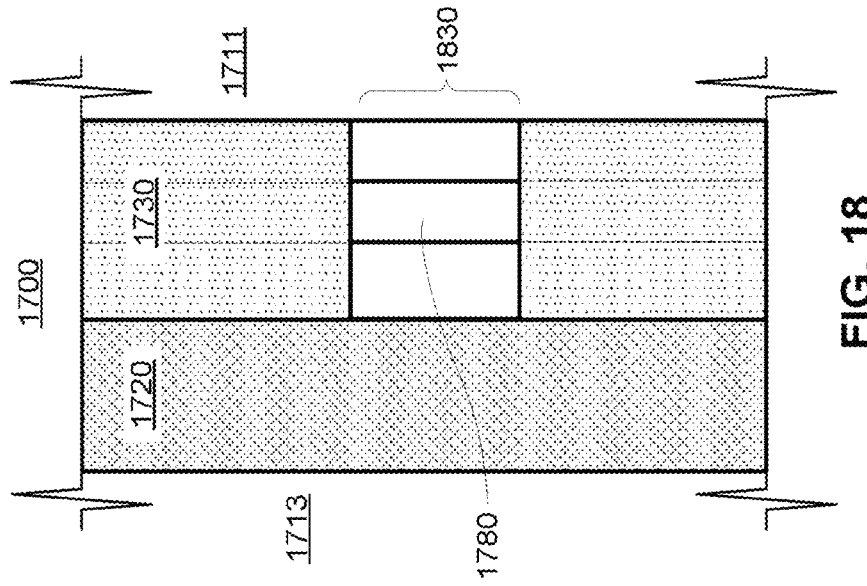
FIG. 18 shows a cross section view of the illustrative sealing ring assembly of FIG. 17 showing a rear ring gap, in accordance with some embodiments of the present disclosure.

FIG. 18 shows a cross section view of illustrative sealing ring assembly 1700 of FIG. 17 showing rear ring gap 1830, in accordance with some embodiments of the present disclosure. FIG. 18 is shown from section 1799 of FIG. 17 (i.e., viewing in a direction radially inward, opposite the direction of axis 1770). Groove 1780 is open to low-pressure region 1711 and is sealed from high-pressure region 1713 by front ring 1720.

Figure 19:
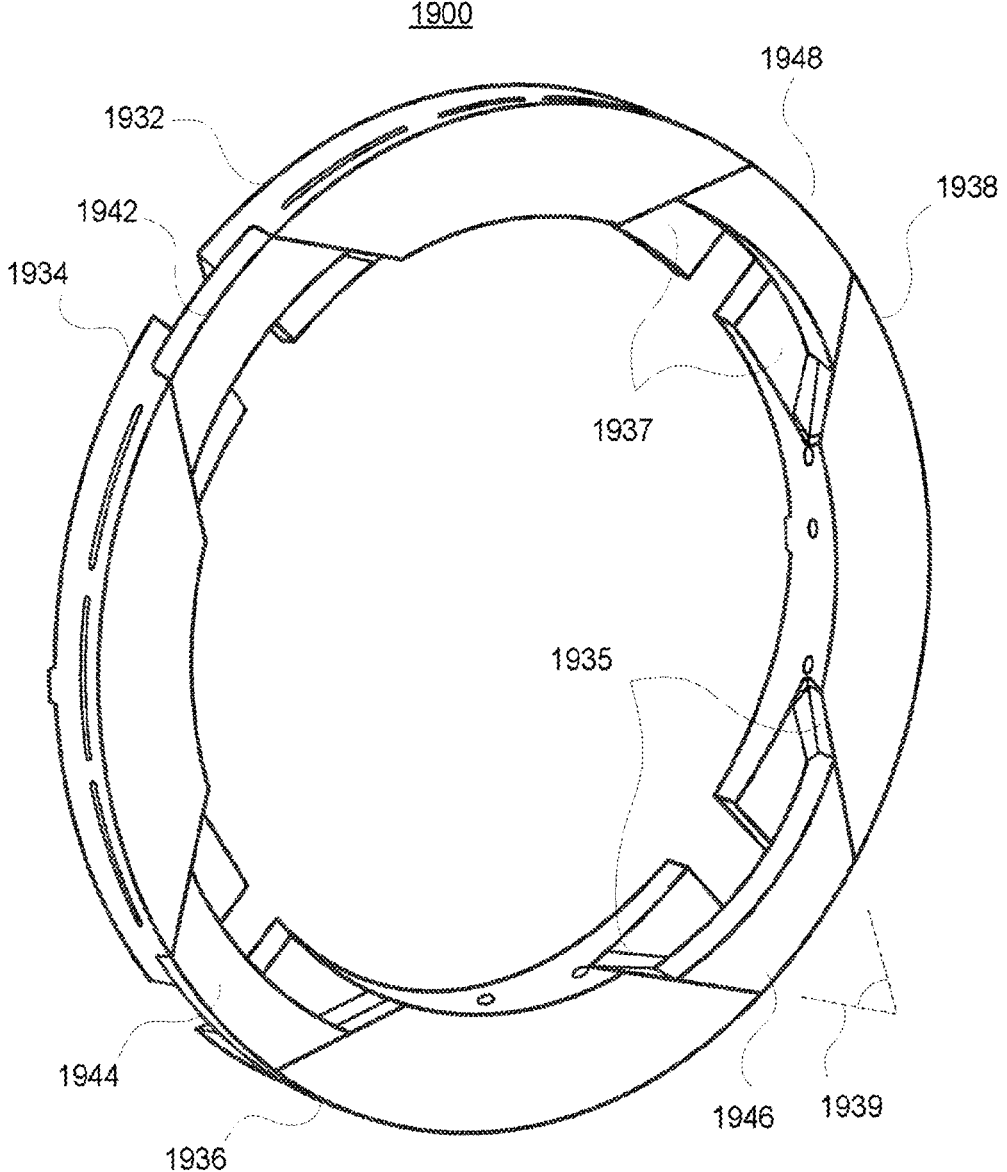
FIG. 19 shows a view of the rear face of an illustrative sealing ring assembly, in accordance with some embodiments of the present disclosure.

FIG. 19 shows a view of the rear face of illustrative sealing ring assembly 1900, in accordance with some embodiments of the present disclosure. Sealing ring assembly 1900 includes ring segments 1932, 1934, 1936, and 1938, as well as gap cover elements 1942, 1944, 1946, and 1948.

Face 1937 (e.g., axially forward of gap cover element 1946 and facing axially rearward) of the interface between ring segments 1932 and 1938 is nominally a flat plane perpendicular to the axis of the ring. As shown in FIG. 19, sides 1935 of the interface between ring segments 1936 and 1938 are symmetric about a plane passing through the center of the radial split in the ring. The sides of gap cover elements 1942, 1944, 1946, and 1948 need not be symmetric, but are shown symmetric for clarity. The sides together form an included angle (e.g., included angle 1939 in FIG. 19 is formed by gap cover element 1936) that is widest at the radially inner surface of the ring and narrowest at the radially outer surface. The mating surfaces between gap cover element 1946 and ring segments 1936 and 1938 may include at least one recess configured to be open to a low-pressure region and not open to (e.g., sealed from) a high-pressure region. For example, the recess may be included in sides 1935, front faces, corresponding mating surfaces of gap cover element 1946, or any combination thereof. Similarly, a recess may be included in any suitable sealing surface between any of illustrative ring segments 1932, 1934, 1936, and 1938 and suitable gap cover elements 1942, 1944, 1946, and 1948.

Aspects

In some embodiments, the features of the present disclosure are configured to reduce friction in dry seals without relying on lubricants, and irrespective of the composition of the surfaces in contact. These features do not substantially rely on large gas pockets which can be used to reduce friction). Rather the feeds function as manifolds for distributing gas into the surface contact asperities. Additionally, or alternatively, these features rely on the gas flow in the contact interface to offset the contact pressure between surfaces, rather than gas fed into non-contacting surfaces and provide a structure that operates based on the physical properties of the flow through the contact asperities, and the contact pressure at a given sealing interface can be tailored based on this flow.

In an illustrative example, some aspects of the features of the present disclosure do not require lubricants. The features depicted herein may be independent of material or surface contact. The incorporation of the features of this disclosure may result in a minimal or otherwise limited reduction to the sealing contact surface area. These features also allow tailoring of local contact pressure as well as average contact pressure and also allow minimal or otherwise reduced gas volume added to the ring-pack (e.g., the sealing ring assembly). Additional or alternative features to those of the present disclosure may be added to the piston land instead of, or in addition to, the ring.

It will be understood that the present disclosure is not limited to the embodiments described herein and can be implemented in the context of any suitable system. In some embodiments, the present disclosure is applicable to linear generators. In some embodiments, the present disclosure is applicable to reciprocating engines and compressors. In some embodiments, the present disclosure is applicable to free-piston engines and compressors. In some embodiments, the present disclosure is applicable to combustion and reaction devices such as a reciprocating engine and a free-piston engine. In some embodiments, the present disclosure is applicable to non-combustion and non-reaction devices such as reciprocating compressors, free-piston heat engines, and free-piston compressors. In some embodiments, the present disclosure is applicable to gas springs, for example having seals between a relatively higher pressure region and a relatively lover pressure region. In some embodiments, the present disclosure is applicable to oil-free reciprocating and free-piston engines and compressors. In some embodiments, the present disclosure is applicable to oil-free free-piston engines with internal or external combustion or reactions. In some embodiments, the present disclosure is applicable to oil-free free-piston engines that operate with compression ignition, chemical ignition (e.g., exposure to a catalytic surface, hypergolic ignition), plasma ignition (e.g., spark ignition), thermal ignition, any other suitable energy source for ignition, or any combination thereof. In some embodiments, the present disclosure is applicable to oil-free free-piston engines that operate with gaseous fuels, liquid fuels, or both. In some embodiments, the present disclosure is applicable to linear free-piston engines. In some embodiments, the present disclosure is applicable to engines that can be combustion engines with internal combustion/reaction or any type of heat engine with external heat addition (e.g., from a heat source such as waste heat or an external reaction such as combustion).

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses but is intended to include variations to and modifications thereof. The following numbered paragraphs describe some aspects of the present disclosure.

What is claimed is:

1. A sealing ring assembly configured to seal against a bore of a cylinder, the sealing ring assembly comprising:
a ring segment comprising a first surface configured to form a sealing interface with the bore; and
a feature configured to receive fluid communicated from a first pressurized region, wherein the first pressurized region is in contact with a second surface of the ring segment during operation, wherein:
the feature comprises a grid patterned array of channels arranged on a third surface of the ring segment, and
the array of channels is configured to enable fluid to form a second pressurized region that is in contact with the third surface of the ring segment during operation.

2. The sealing ring assembly of claim 1, wherein the second surface faces opposite of the first surface.

3. The sealing ring assembly of claim 1, wherein the third surface is perpendicular to the first surface.

4. The sealing ring assembly of claim 1, wherein the grid patterned array of channels is embedded in the third surface.

5. The sealing ring assembly of claim 1, wherein the feature is configured to reduce a friction force between the third surface and a piston surface arranged to contact the third surface.

6. The sealing ring assembly of claim 1, wherein the feature is configured to reduce a contact force in an axial direction in response to receiving the fluid from the first pressurized region.

7. The sealing ring assembly of claim 1, wherein the feature is configured to reduce a contact force between the third surface and a surface of a piston when at least partially filled with the fluid from the first pressurized region.

8. A device comprising:
a cylinder comprising a bore;
a translator comprising a piston arranged to move along the bore without a liquid lubricant or oil, wherein the piston comprises a ring groove;
a sealing element arranged in the ring groove to contact a surface of the ring groove at a first interface and to seal against the bore of the cylinder at a second interface; and
a feature comprising a grid patterned array of channels arranged at the first interface that is configured to reduce friction between the sealing element and the surface of the ring groove.

9. The device of claim 8, wherein:
the sealing element defines a lower-pressure region and a higher-pressure region;
the piston is configured to undergo successive strokes along the bore;
fluid is configured to flow from the higher-pressure region to the feature during at least some of each successive stroke;
the fluid flows from the feature to the first interface during at least some of each stroke; and
the fluid flows from the first interface to the lower-pressure region during at least some of each stroke.

10. The device of claim 8, wherein the feature comprises a set of channels arranged to receive fluid from a pressurized region of the cylinder to lessen a contact force on the sealing element.

11. The device of claim 8, wherein the feature is configured to reduce a contact force on the sealing element by reducing a friction force on the sealing element.

12. The device of claim 8, wherein the feature comprises a pocket configured to receive fluid communicated from a pressurized region.

\* \* \* \* \*